(12) United States Patent
Kirsch et al.

(10) Patent No.: US 11,151,828 B2
(45) Date of Patent: Oct. 19, 2021

(54) FRICTIONLESS BUILDING ACCESS CONTROL SYSTEM WITH TAILGATE DETECTION

(71) Applicant: Johnson Controls Tyco IP Holdings LLP, Milwaukee, WI (US)

(72) Inventors: Lior Kirsch, Ramat Gan (IL); Yohai Falik, Petah Tivka (IL); Igal Dvir, Zichron Yaakov (IL)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/414,414

(22) Filed: May 16, 2019

(65) Prior Publication Data
US 2019/0355193 A1     Nov. 21, 2019

Related U.S. Application Data

(60) Provisional application No. 62/672,860, filed on May 17, 2018.

(51) Int. Cl.
*G07C 9/37*        (2020.01)
*G08B 13/196*    (2006.01)
(Continued)

(52) U.S. Cl.
CPC ........... *G07C 9/37* (2020.01); *G06K 9/00288* (2013.01); *G06K 9/00335* (2013.01); *G07C 9/38* (2020.01); *G08B 13/19613* (2013.01)

(58) Field of Classification Search
CPC .. G06K 9/00288; G06K 9/00335; G07C 9/37; G07C 9/38; G08B 13/19643
(Continued)

(56) References Cited

U.S. PATENT DOCUMENTS

| 8,740,382 B1* | 6/2014 | Liu ........................ A61B 3/113 351/210 |
| 10,380,814 B1* | 8/2019 | Mathiesen ............. G07C 9/253 |

(Continued)

FOREIGN PATENT DOCUMENTS

| CN | 202126693 U | 1/2012 |
| CN | 103336950 A | 10/2013 |
| EP | 2711899 A2 | 3/2014 |

OTHER PUBLICATIONS

T. Bourlai et al., Chapter 30 Ascertaining Human Identity in Night Environments, Distributed Video Sensor Networks, 2011, pp. 451-467, Morgantown, WV., USA.

(Continued)

*Primary Examiner* — Daniel G Mariam
(74) *Attorney, Agent, or Firm* — Foley & Lardner LLP

(57) ABSTRACT

A building access system for a building including a front facing camera system configured to capture one or more images of a face of a user, wherein one or more front facing camera processing circuits configured to detect and authenticate the user based on the one or more images captured by the front facing camera system and operate building equipment. The system further including a down facing camera system configured to capture one or more overhead images of the user from an overhead perspective, wherein one or more down facing camera processing circuits configured to detect whether a second user is tailgating the user based on the one or more overhead images captured by the down facing camera system and generate an alarm in response to a detection that the second user is tailgating the user.

20 Claims, 17 Drawing Sheets

(51) Int. Cl.
*G06K 9/00* (2006.01)
*G07C 9/38* (2020.01)

(58) Field of Classification Search
USPC .................................................. 382/118, 218
See application file for complete search history.

(56) References Cited

U.S. PATENT DOCUMENTS

| | | | | |
|---|---|---|---|---|
| 2002/0094111 | A1* | 7/2002 | Puchek | G06K 9/00973 382/115 |
| 2005/0226471 | A1 | 10/2005 | Singh et al. | |
| 2018/0016836 | A1* | 1/2018 | Ibsies | E05B 41/00 |
| 2018/0102583 | A1* | 4/2018 | Trani | H01Q 1/44 |
| 2019/0228248 | A1* | 7/2019 | Han | G06F 21/32 |
| 2019/0325682 | A1* | 10/2019 | Petkov | H04N 9/045 |

OTHER PUBLICATIONS

Brightek develops IR LED for face recognition, Dec. 1, 2015, 1 page.
Mark Peterson, Day/Night Demystified, Theia Technologies 2009, 3 pages.
Jonathan Dowdall et al., ScienceDirect, Image and Vision Computing, Face Detection in the Near-IR Spectrum, vol. 21, Issue 7, Jul. 2003, 2 pages, Elsevier B.V.
Shayne Rana, How to: Enable night vision on a webcam, Jul. 13, 2011, 6 pages.
Stan Z. Li et al., IEEE Transactions on Pattern Analysis and Machine Intelligence, Illumination Invariant Face Recognition Using Near-Infrared Images, vol. 29, No. 4, Feb. 13, 2007, 13 pages, IEEE Computer Society.
Alex Perala, TweetLikePlusPinitShare, Sensible Vision 3D Facial Recognition System Works in Bright Sunlight, Sep. 28, 2017, 1 page.
Vivotek, V-Series—IP816A-LPC-2MP, 30/60fps, WDR Pro, SNV, RBF, License Plate Capture, URL: https://www.vivotek.com/ip816a-lpc#views:view=jplist-grid-view, Retrieved Dec. 3, 2020, 4 pages.

* cited by examiner

Two People

Tailgating

Person With Object

Person With Hat

FRICTIONLESS BUILDING ACCESS CONTROL SYSTEM WITH TAILGATE DETECTION

CROSS-REFERENCE TO RELATED APPLICATION

This application claims the benefit of and priority to U.S. Provisional Patent Application No. 62/672,860 filed May 17, 2018, the entirety of which is incorporated by reference herein.

BACKGROUND

The present disclosure relates generally to the field of building security systems. The present disclosure relates more particularly to systems and methods for access control for a building.

Some buildings may have access control systems for various entrances into a building and/or for various areas within a building. In some cases, the access control systems use card reader systems configured to detect an access card of a user and then provide or deny the user access to the building or areas within a building. However, with a system that relies on cards carried by users, one user may authenticate with the card reader system via their card but one or more other users may pass through the door with the authenticated user, i.e., one user may tailgate the authenticated user to gain access to the building. In some cases, the tailgating user may be unauthorized and should not be given access to the building. The card reader system may not have any mechanism to detect the tailgating user.

SUMMARY

One implementation of the present disclosure is a building access system for a building. The building access system including a front facing camera system configured to capture one or more images of a face of a user, wherein the front facing camera system includes one or more front facing camera processing circuits configured to detect and authenticate the user based on the one or more images captured by the front facing camera system and operate building equipment to unlock a door of the building in response to an authentication of the user based on the one or more images of the front facing camera system. The system includes a down facing camera system configured to capture one or more overhead images of the user from an overhead perspective, wherein the down facing camera system includes one or more down facing camera processing circuits configured to detect whether a second user is tailgating the user based on the one or more overhead images captured by the down facing camera system and generate an alarm in response to a detection that the second user is tailgating the user.

In some embodiments, the one or more down facing camera processing circuits are configured to detect, based on the one or more overhead images captured by the down facing camera system, a gesture by the user, wherein the gesture is associated with a command to unlock the door and operate the building equipment to unlock the door of the building in response to a gesture detection indicating that the gesture has been performed.

In some embodiments, the one or more overhead images captured by the down facing camera system include one or more three dimensional images, wherein values of pixels of the one or more three dimensional images indicate a distance from the down facing camera system. In some embodiments, the one or more down facing camera processing circuits are configured to detect whether the second user is tailgating the user by determining, based on the one or more three dimensional images, a number of users that are walking through the door and determining that the second user is tailgating the user in response to a determination that the number of users that are walking through the door is greater than one.

In some embodiments, the one or more images captured by the front facing camera system include one or more three dimensional images and one or more two dimensional images, wherein first values of pixels of the one or more three dimensional images indicate a distance from the front facing camera system and second values of pixels of the one or more two dimensional images indicate color. In some embodiments, the front facing camera system includes a three dimensional camera configured to capture the one or more three dimensional images and a two dimensional camera configured to captured the one or more two dimensional images.

In some embodiments, the one or more front facing camera processing circuits are configured to detect and authenticate the user based on the one or more images by detecting an identify of the user based on the one or more two dimensional images, determining whether the identity of the user is an authorized identity, detecting a facial topography of the user based on the one or more three dimensional images, determining whether the facial topography matches an authentic facial topography, and determining that the user is authenticated in response to a determination that the identity of the user is the authorized identify and a second detection that the facial topography matches the authentic facial topography.

In some embodiments, the front facing camera system further includes an infrared light system configured to generate infrared light that reflects off the face of the user. In some embodiments, the front facing camera system includes an aperture device configured to receive the infrared light and visible light and pass the infrared light and the visible light to a visible light filter, the visible light filter configured to filter out the visible light and pass the infrared light to an image capturing device, and the image capturing device configured to generate an image of the face of the user based on the infrared light passed by the visible light filter. In some embodiments, the one or more front facing camera processing circuits are configured to perform facial recognition based on the image.

In some embodiments, the visible light filter is a bandpass filter, wherein a pass band of the bandpass filter includes a spectrum of infrared light wavelengths.

In some embodiments, the front facing camera system further include an infrared light system configured to generate infrared light that reflects off the face of the user, an aperture device configured to receive the infrared light and visible light and pass the infrared light and the visible light to an infrared light filter, the infrared light filter configured to filter out the infrared light and pass the visible light to an image capturing device in a day operating mode and pass the infrared light and pass the visible light to the image capturing device in a night operating mode, and the image capturing device configured to generate an image of the face of the user based on the visible light in the day operating mode and generate the image of the face of the user based on the visible light and the infrared light in the night operating mode. The one or more front facing camera processing circuits are configured to cause the image capturing device to generate the face of the image based on the visible light and the infrared light by causing the infrared light filter to operate in the night operating mode and perform facial recognition based on the image generated based on the visible light and the infrared light.

In some embodiments, the infrared light filter is a cutoff filter, wherein a pass band of the cutoff filter includes a spectrum of visible light wavelengths and a stop band of the cutoff filter includes a spectrum of infrared light wavelengths.

In some embodiments, the system further includes a snapshot camera, wherein the snapshot camera is configured to capture one or more snapshot images of the user or the second user after the user or the second user has walked through the door, wherein the snapshot camera includes one or more processing circuits configured to store an image buffer in a memory device, the image buffer including a predefined number of most recent images captured by the snapshot camera, receive an indication of a time associated with the door opening, retrieve a set of images of the image buffer stored by the memory device based on the time associated with the door opening in response to receiving the indication, and communicate the set of images to a server via a network.

In some embodiments, the front facing camera system is powered via a permanent power source and the down facing camera system is powered via the permanent power source. In some embodiments, the snapshot camera includes a mobile power circuit, wherein the mobile power circuit is configured to store energy and power the snapshot camera based on the energy.

In some embodiments, the one or more images captured by the front facing camera system include first pixels indicating the face of the user as the user approaches the door, wherein the one or more overhead images captured by the down facing camera system include second pixels indicating the top of a head and shoulders of the user as the user walks through the door, and the one or more snapshot images captured by the snapshot camera include third pixels indicating a front side of the user as the user walks through the door.

In some embodiments, the front facing camera system is located on a first side of the door, the down facing camera system is located on a second side of the door, and the snapshot camera is located on the second side of the door.

Another implementation of the present disclosure is an access control system for a building. The system including a front facing camera system configured to capture one or more images of a face of a user, a down facing camera system configured to capture one or more overhead images of the user from an overhead perspective, and one or more processing circuits. The one or more processing circuits are configured to detect and authenticate the user based on the one or more images captured by the front facing camera system, operate building equipment to unlock a door of the building in response to an authentication of the user based on the one or more images of the front facing camera system, detect whether a second user is tailgating the user based on the one or more overhead images captured by the down facing camera system, and generate an alarm in response to a detection that the second user is tailgating the user.

In some embodiments, the one or more overhead images captured by the down facing camera system include one or more three dimensional images, wherein values of pixels of the one or more three dimensional images indicate a distance from the down facing camera system. The one or more processing circuits are configured to detect whether the second user is tailgating the user by determining, based on the one or more three dimensional images, a number of users that are walking through the door and determining that the second user is tailgating the user in response to a determination that the number of users that are walking through the door is greater than one.

In some embodiments, the one or more images captured by the front facing camera system include one or more three dimensional images and one or more two dimensional images, wherein first values of pixels of the one or more three dimensional images indicate a distance from the front facing camera system and second values of pixels of the one or more two dimensional images indicate color. In some embodiments, the front facing camera system includes a three dimensional camera configured to capture the one or more three dimensional images and a two dimensional camera configured to captured the one or more two dimensional images. In some embodiments, the one or more processing circuits are configured to detect and authenticate the user based on the one or more images by detecting an identify of the user based on the one or more two dimensional images, determining whether the identity of the user is an authorized identity, detecting a facial topography of the user based on the one or more three dimensional images, determining whether the facial topography matches an authentic facial topography, and determining that the user is authenticated in response to a determination that the identity of the user is the authorized identify and a second detection that the facial topography matches the authentic facial topography.

In some embodiments, the front facing camera system further include an infrared light system configured to generate infrared light that reflects off the face of the user, an aperture device configured to receive the infrared light and visible light and pass the infrared light and the visible light to a visible light filter, the visible light filter configured to filter out the visible light and pass the infrared light to an image capturing device, and the image capturing device configured to generate an image of the face of the user based on the infrared light passed by the visible light filter. In some embodiments, the one or more processing circuits are configured to perform facial recognition based on the image.

In some embodiments, the front facing camera system further includes an infrared light system configured to generate infrared light that reflects off the face of the user, an aperture device configured to receive the infrared light and visible light and pass the infrared light and the visible light to an infrared light filter, the infrared light filter configured to filter out the infrared light and pass the visible light to an image capturing device in a day operating mode and pass the infrared light and pass the visible light to the image capturing device in a night operating mode and the image capturing device configured to generate an image of the face of the user based on the visible light in the day operating mode and generate the image of the face of the user based on the visible light and the infrared light in the night operating mode. The one or more processing circuits configured to cause the image capturing device to generate the face of the image based on the visible light and the infrared light by causing the infrared light filter to operate in the night operating mode and perform facial recognition based on the image generated based on the visible light and the infrared light.

In some embodiments, the system includes a snapshot camera, wherein the snapshot camera is configured to capture one or more snapshot images of the user or the second user after the user or the second user has walked through the door, wherein the snapshot camera includes one or more snapshot camera processing circuits configured to store an image buffer in a memory device, the image buffer including a predefined number of most recent images captured by the snapshot camera, receive an indication of a time associated with the door opening, retrieve a set of images of the image buffer stored by the memory device based on the time associated with the door opening in response to receiving the indication, and communicate the set of images to a server via a network.

Another implementation of the present disclosure is a method of access control for a building, method including capturing, by a front facing camera, one or more images of a face of a user, capturing, by a down facing camera, one or more overhead images of the user from an overhead perspective, detecting and authenticating, by a processing circuit, the user based on the one or more overhead images captured by the front facing camera, operating, by the processing circuit, building equipment to unlock a door of the building in response to an authentication of the user based on the one or more images of the front facing camera, detecting, by the processing circuit, whether a second user is tailgating the user based on the one or more overhead images captured by the down facing camera, and generating, by the processing circuit, an alarm in response to a detection that the second user is tailgating the user.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
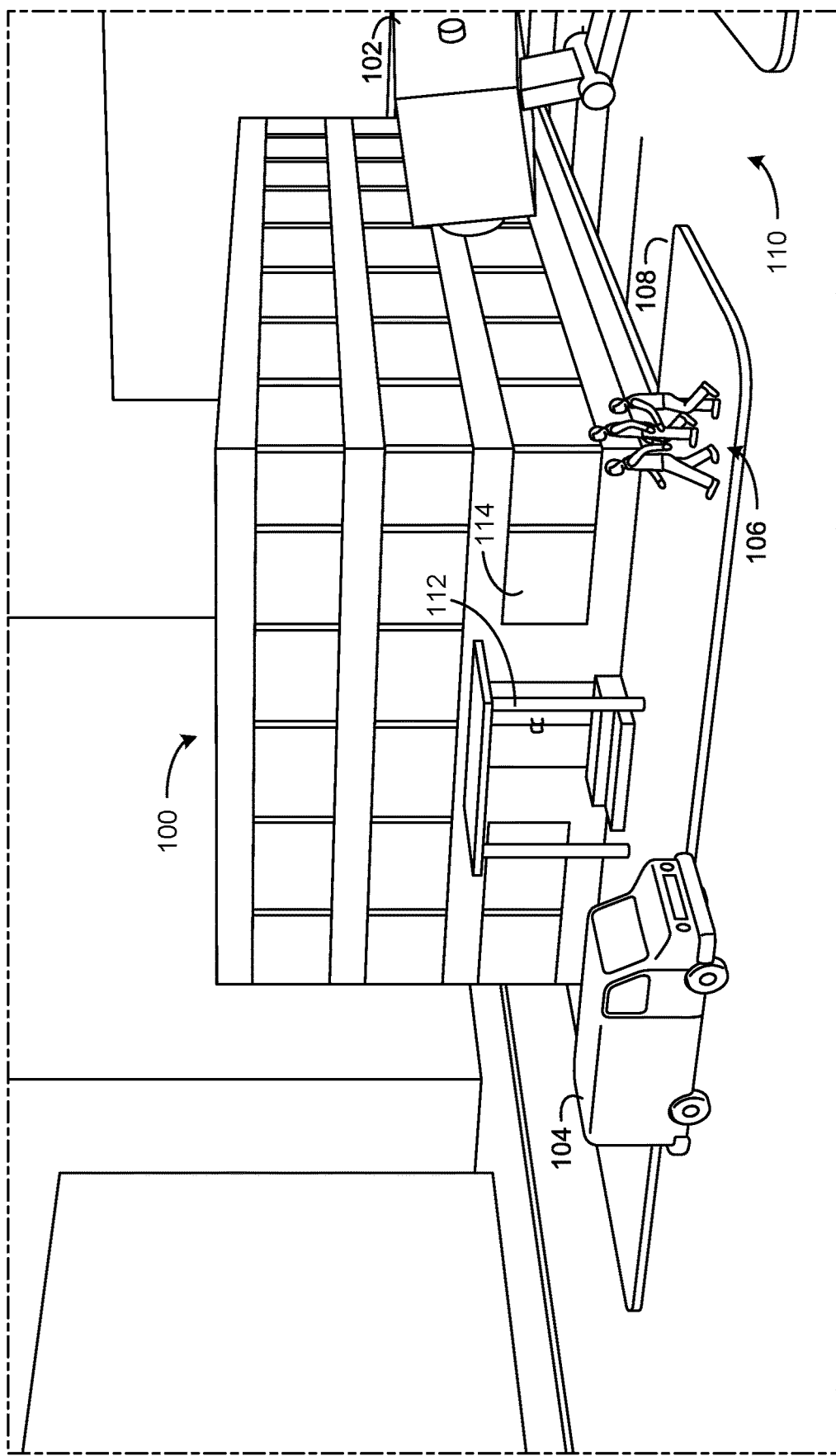
FIG. 1 is a perspective view schematic drawing of a building with a security system, according to some embodiments.

Referring generally to the FIGURES, systems and methods are shown for a building access control system with tailgate detection, according to various exemplary embodiments. Access control is one of the most essential components in a building security system. The most basic component in any secured building is controlling entrances and exits to the building and to various facilities within the building. Building access control systems face various challenges including authenticating some authorized people while preventing entrance of unauthorized people, preventing or detecting tailgating (unauthorized people that enter together with authorized people), and capturing a good image of all people that enter the door, per each transaction.

In many building access systems, authentication is performed via a badge carried by a user. The badge can include a passive radio frequency (RF) chip inside and a RF reader next to the door. When a user wants the door to be opened, the user brings their badge next to the reader such that the badge ID can be verified and the door will open in the event that badge is certified.

Using a badge and a RF reader has a few drawbacks. For example, a badge can be passed from one person to another, either intentionally or unintentionally. Furthermore, the badge can be duplicated. Authorized users need to always carry their badge with them. If a user forgets their badge at their home, this can cause significant inconvenience to the user. The user requires at least one free hand to scan their badge with the access control system, which can be limiting some time while carrying items. Furthermore, using a badge system cannot prevent or detect tailgating. Tailgating may be an unauthorized user (or in some cases another authorized user) closely following behind an authorized user so that when the access control system allows the authorized user to enter through an entrance, the unauthorized user closely follows behind the authorized user and gains access through the entrance. Furthermore, there is no record for the real identity of the person/people that enter the door with a badge, for example, there is no way of knowing if the user using the badge is the individual assigned to the badge. Also, using badges requires extra effort and cost.

Due to the imitations of a badge based access control system, alternative technologies based on human biometrics can be used for recognizing and authenticating users and providing or denying access through various entrance ways of a building. Face recognition may be one human biometric for an access control system. However, normally, facial recognition access control systems may not achieve the required ratio between false acceptance and miss detection to be reliable. Using deep neural networks (and other analysis algorithms as discussed herein), a facial image based access control system can significantly outperform conventional facial recognition systems and enable a frictionless access control system. In some cases, deep neural network algorithms require expensive computational units (e.g., graphics processing units (GPUs)). Furthermore, in order to prevent tailgating, conventional access control systems may use physical barriers to prevent adjacent people from entering, without swapping a badge again. Such barriers are expensive, requires extra space and many times inconvenient.

To solve the aforementioned shortcomings of building access control systems, the systems and methods as discussed herein, can, according to various embodiments, include a front facing three dimensional (3D) camera sensor for facial recognition. This front facing camera can be utilized by an image analysis system to perform face recognition and liveliness verification. Furthermore, the systems and methods discussed herein can include a down facing 3D camera sensor for tailgating detection. Based on images captured by the down facing 3D camera, the image analysis system is configured to identify whether one user is tailgating another user and raise an alarm in response to the detection of tailgating in some embodiments. Finally, the systems and methods can include a battery driven snapshot camera placed inside the facility for archiving indications of all people that have entered the facility. This enables both authorized users, and unauthorized tailgaters to be detected and logged.

The systems and methods discussed herein can perform face recognition for biometric frictionless access control, perform tailgating detection and people counting, and can include capturing overview snapshots of all people that enter through an entryway of a building. The systems and methods discussed herein can be implemented in a cloud and/or locally on sensors. Performing the processing locally requires zero installation costs. In some embodiments, the down facing 3D camera and the front facing 3D camera are powered via a permanent power source while the wall camera, the overview camera, is battery powered.

The front facing camera can suffer from overexposure in some instances. For example, if the front facing camera is configured to capture a face of an individual but the individual is standing in front of a window where sunlight is coming through, the front facing camera may not be able to properly capture an image of the face of the user and thus may not be able to properly perform facial recognition and authentication of the user. Overexposure can be caused by any type of light source, e.g., natural or artificial light.

The front facing camera, or a system associated with the front facing camera, can in some cases, illuminate the individual with IR light and generate the image for facial recognition based on the IR light reflected off of the individual. The individual can be illuminated by IR light via an IR light emitting diode (LED) system. Even though the camera may be overexposed with visible light, if the camera generates the image solely or in part based on the IR light, the IR light generated image can allow the facial recognition to be performed correctly even in the presence of the backlight source.

In some cases, the front facing camera includes a visible light filter, for example, a cutoff filter. The visible light filter can filter out all visible light but pass the IR light illuminating and reflecting off of the individual. An image capturing device of the camera can then generate the image based on the filtering result of the visible light filter. In this regard, the images generated solely on the IR light can be used by the front facing camera to perform facial image recognition and authentication of the face of the individual.

In some cases, the front facing camera may not include an IR filter. Instead, or in addition to the visible light filter, the camera may include an IR filter that operates in a night mode passing both IR light and visible light and a day mode where IR light is filtered out and only visible light is passed. The camera can operate in the night mode such that the images generated by the camera are generated based in part on the reflected IR light and visible light. The images can be used for performing facial recognition and can improve the facial recognition such that, even in the presence of overexposure due to backlighting, the camera can successfully perform facial recognition and user authentication.

Building Security System

Referring now to FIG. 1, a building 100 with a security camera 102 and a parking lot 110 is shown, according to an exemplary embodiment. The building 100 is a multi-story commercial building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
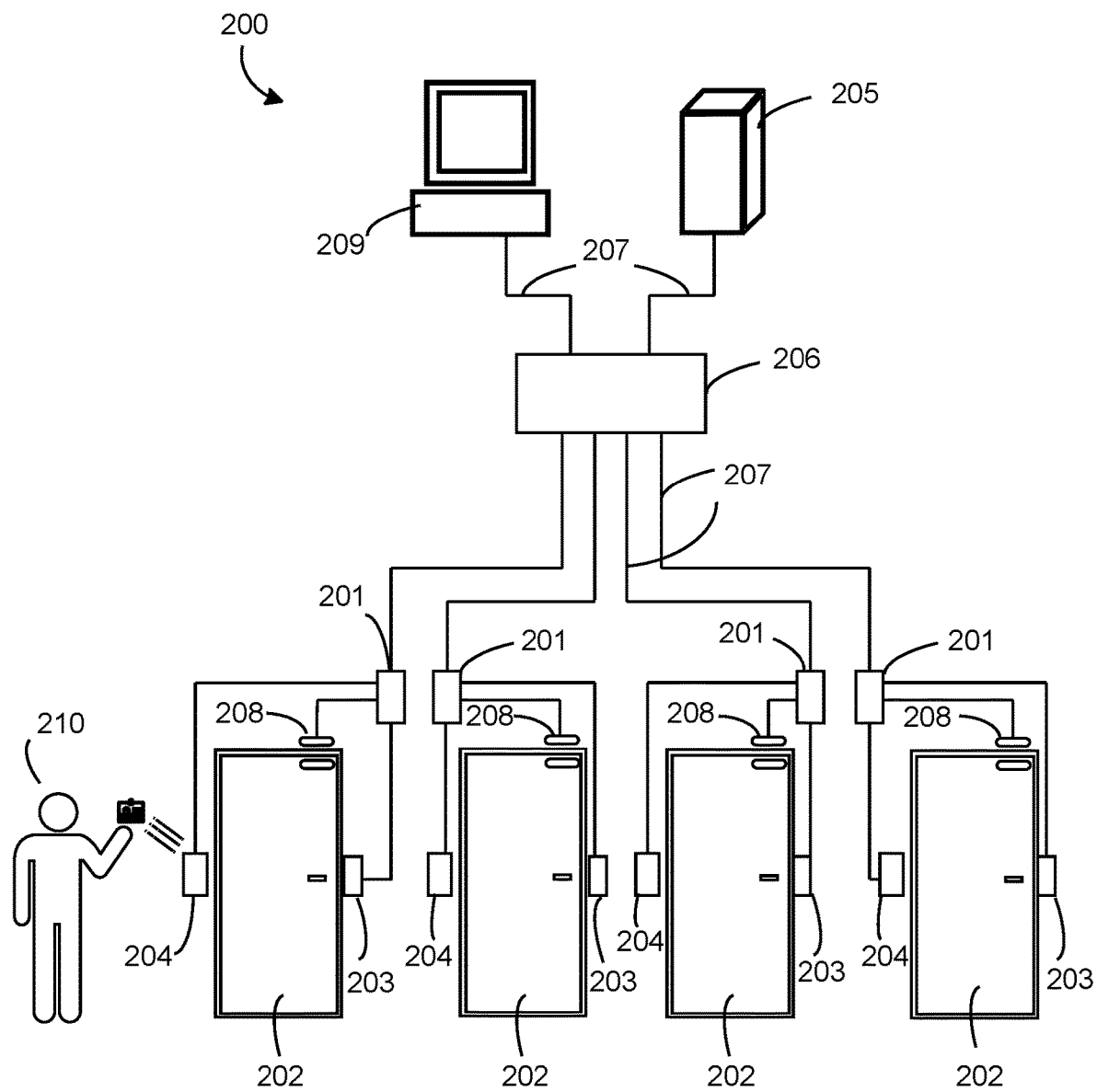
FIG. 2 is a block diagram illustrating several components of an access control system (ACS) that can be implemented in the building security system of FIG. 2, according to some embodiments.

Referring now to FIG. 2, a block diagram of an ACS 200 is shown, according to an exemplary embodiment. The ACS 200 can be implemented in any of the building 100 as described with reference to FIG. 1. The ACS 200 is shown to include doors 202. Each of the doors 202 is associated with a door lock 203, an access reader module 204, and one or more door sensors 208. The door locks 203, the access reader modules 204, and the door sensors 208 may be connected to access controllers 201. The access controllers 201 may be connected to a network switch 206 that directs signals, according to the configuration of the ACS 200, through network connections 207 (e.g., physical wires or wireless communications links) interconnecting the access controllers 201 to an ACS server 205. The ACS server 205 may be connected to an end-user terminal or interface 209 through network switch 206 and the network connections 207.

The ACS 200 can be configured to grant or deny access to a controlled or secured area. For example, a person 210 may approach the access reader module 204 and present credentials, such as an access card. The access reader module 204 may read the access card to identify a card ID or user ID associated with the access card. The card ID or user ID may be sent from the access reader module 204 to the access controller 201, which determines whether to unlock the door lock 203 or open the door 202 based on whether the person 210 associated with the card ID or user ID has permission to access the controlled or secured area.

Frictionless Building Access Control System

Figure 3:
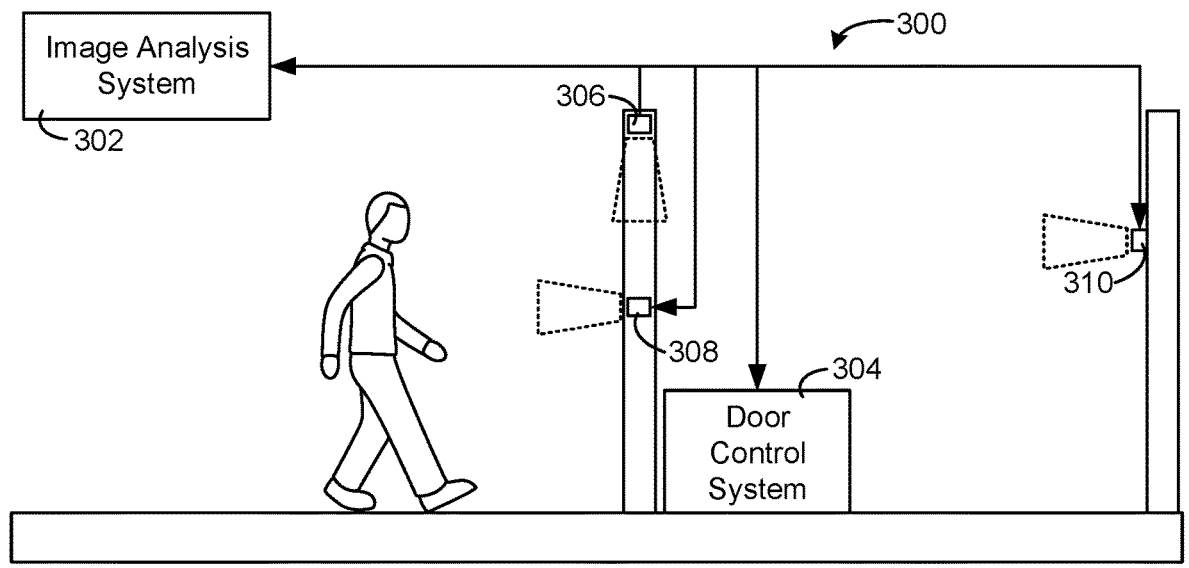
FIG. 3 is a perspective view schematic drawing of an access system with a front facing camera, a down facing camera, and a battery driven wall camera, according to an exemplary embodiment.
Figure 4:
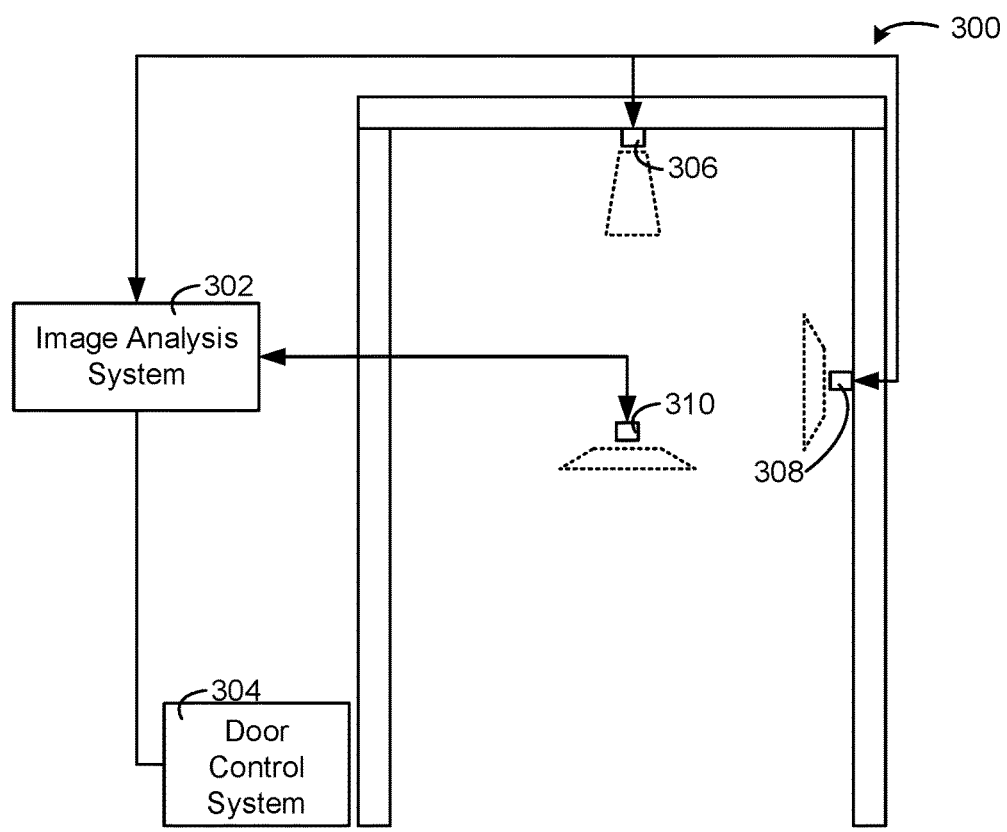
FIG. 4 is a perspective view schematic drawing of the access system of FIG. 3 illustrated from another view, according to an exemplary embodiment.

Referring now to FIGS. 3-4, a frictionless building access control system 300 that includes a front facing camera 308 attached to a side of a door frame and a down facing camera 306 attached to the top of the door frame in some embodiments. The frictionless building access control system 300 can be provided in the building 10 of FIG. 1 or a portion thereof (e.g., an entrance of the building 10, a store room of the building 10, a particular room of the building 10, a group of rooms, etc.) The frictionless access control system 300 can be part of a BMS system. In some embodiments, the frictionless access control system 300 is a separate stand-alone system or is integrated with another security or authorization system. The front facing camera 308 and/or the down facing camera 306 can be three dimensional cameras. These cameras can capture both a color pixel image (two dimensional (2D) image) and a three dimensional depth image (3D image). The system 300 can detect tailgating, a situation where one user authenticates with an authentication system and multiple unauthorized users enter, and/or can detect door tapping, where a before a door closes, another user holds the door open and enters without a card. Furthermore, unlike conventional mobile phone based authentication, the system 300 can detect whether a user walks through a door that they are authenticated to walk through and not another door that they are not authenticated to walk through.

The front facing camera 308, in some embodiments, may be a hardware component integrated into a door frame and/or otherwise located on or around the door frame of a door. The front facing camera 308 can capture images of users approaching the door. In some embodiments, the images include a face of the user. In some embodiments, the images include the entire body of the user. The camera 308 can locally perform facial image recognition and authentication to determine whether to operate the door control system 304 to unlock the door and allow the user to pass through the door. In some embodiments, images captured by the camera 308 are provided to the image analysis system 302 and the image analysis system 302 remotely (or locally) performs facial recognition and authentication and operates the door control system 304 to provide the user access to a building if the user is authenticated.

The system 300 can be implemented as an enterprise access control system, an airport security system, in a mass transportation system, and/or a facility with high security. The system 300 can provide highly reliable detection with a low level of false alarms. In some embodiments, system 300 integrates and/or includes a cell phone based occupancy detection system. Based on a cell phone identifier reported by a cell phone tracking system, the system 300 can building a cross correlation of user phone identifiers and user faces. In some embodiments, system 300 includes two layers to perform authentication, first, cell phone identifier based authentication and/or second facial recognition.

The system 300 includes a snapshot camera 310 in some embodiments. The snapshot camera 310 is a battery powered camera placed on a far wall configured to capture images of any user that enters through the door, in some embodiments. The snapshot camera 310 is installed in a position such that it can properly capture the full field of view of the people that enter the door, in some embodiments. The snapshot camera 310 is configured to take snapshots from a time when the door is opened till the time it is closed in some embodiments. For example, door control system 304 is configured to unlock the door and detect whether the door has been opened and/or closed in some embodiments. The door control system 304 (or the image analysis system 302 or the front facing camera 308) can send an indication to snapshot camera 310 that the door has been opened. In response to receiving the indication, the snapshot camera 310 can begin taking snapshots (and/or recording video) from a predefined length of time or until the door closes (or a predefined amount of time after the door closes). The door control system 304 (or the image analysis system 302 or the front facing camera 308) can further send an indication to the snapshot camera 310 that the door has been closed. In response to receiving the indication that the door has been closed, the snapshot camera 310 can cease taking snapshots (and/or recording video).

System 300 includes the image analysis system 302 and the door control system 304 in some embodiments. The door control system 304 is configured to lock and/or unlock the door in some embodiments. The door control system 304 can include various sensors and/or actuators. The sensors can detect whether the door is open, closed, being held open, etc. The door control system 304 can include actuators, e.g., locks that enable the door to be locked and/or unlocked by the door control system 304. In some embodiments, the image analysis system 302 is configured to send a control command to operate the door control system 304 to lock and/or unlock the door. In this regard, the image analysis system 302 is configured, based on an image captured by the front facing camera 308, to detect whether the user is authorized to gain access through the doorway in some embodiments. In response to determining that the user is authorized, the image analysis system 302 is configured to operate the door control system 304 to unlock the door in some embodiments.

The image analysis system 302 can be a remote system, e.g., a cloud computing system, a computing system located within a building but remote from the door of FIG. 3, and/or can be integrated locally with the cameras 306 and 308. The image analysis system 302 is configured to receive images captured from front facing camera 308 to determine whether to lock or unlock the door in some embodiments. The image analysis system 302 is configured to receive images from the down facing camera 306 and utilize the images from the down facing camera 306 to determine whether an authorized user is being tailgated in some embodiments. In response to determining, based on the images captured via the down facing camera 306, the image analysis system 302 is configured to raise an alarm, indicating that a user has gained unauthorized access to the door in some embodiments. Finally, the image analysis system 302 configured to receive snapshots from the snapshot camera 310, in some embodiments. The image analysis system 302 is configured to communicate with the snapshot camera 310, the down facing camera 306, and/or the front facing camera 308 either via wired communication or via a wireless network (e.g., Wi-Fi, Bluetooth, Zigbee, etc.), in some embodiments.

The image analysis system 302 is configured to cause the snapshot camera 310 to begin taking images and stop capturing images, in some embodiments. For example, image analysis system 302 is configured to receive an identification of the door being opened and/or closed from door control system 304 in some embodiments. In this regard, image analysis system 302 is configured to cause the snapshot camera 310 to begin capturing images and stop capturing images in response to the identification of the door being opened and/or closed. In some embodiments, the snapshot camera 310 includes a memory buffer, in some embodiments. The snapshot camera 310 can periodically capture images and save the images in the memory buffer. The image analysis system 302 can retrieve images from the memory buffer based on a timestamp associate with the time that the door is opened and a timestamp associated with when the door is closed. In this regard, the snapshot camera 310 is configured to receive the timestamps (or other commands) and provide the images from the memory buffer that occur within the two timestamps and provide the buffer images to the image analysis system 302 in some embodiments.

Figure 5A:
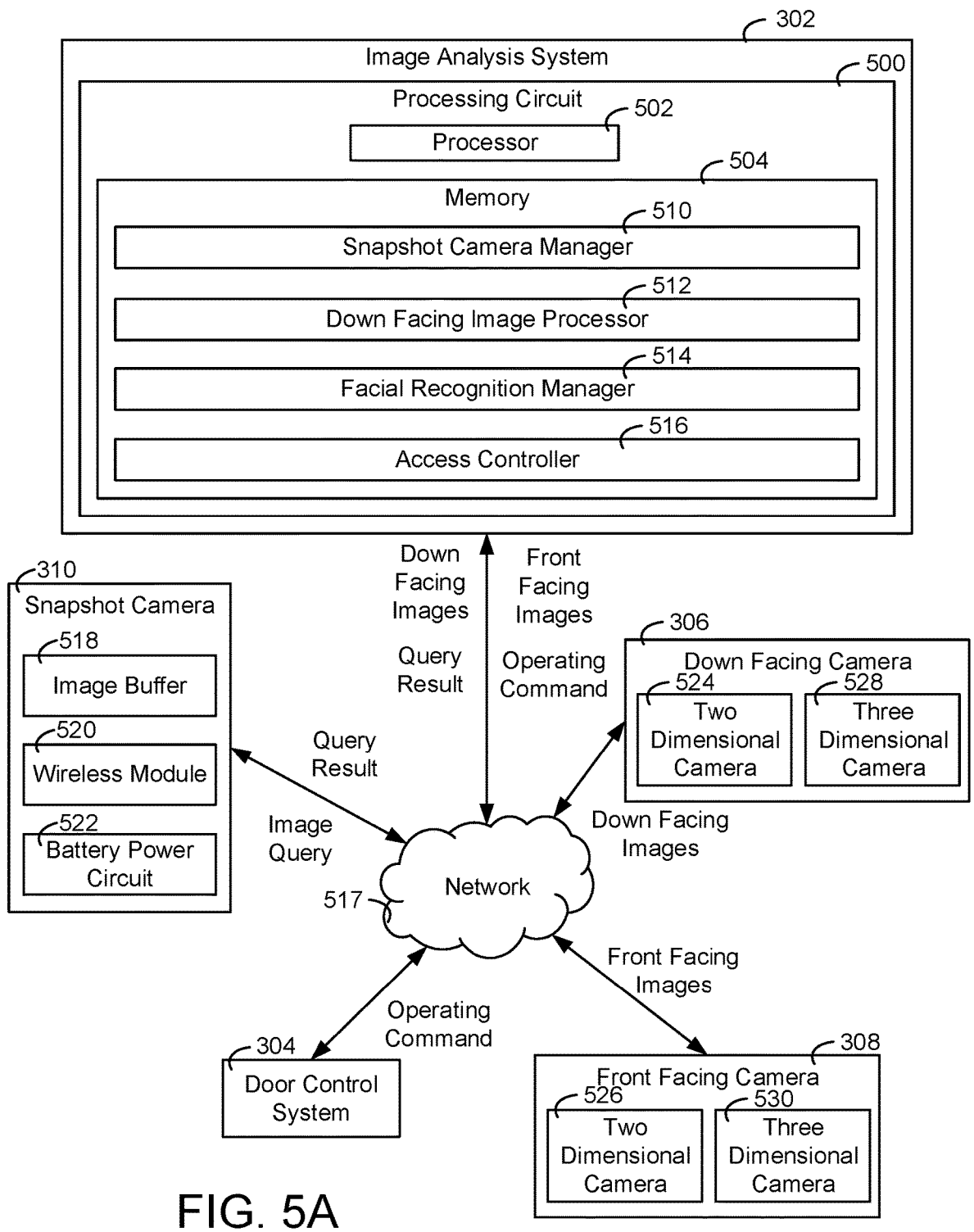
FIG. 5A is a block diagram of an image analysis system of the access system of FIGS. 3-4, according to an exemplary embodiment.

Referring now to FIG. 5A, a block diagram of the image analysis system 302 illustrating the image analysis system 302 in greater detail is shown, according to an exemplary embodiment. FIG. 5A also illustrates the snapshot camera 310 in greater detail. Regarding the snapshot camera 310, the snapshot camera 310 is shown to include an image buffer 518, a wireless module 520, and a battery power circuit 522. The snapshot camera 310 may be a battery powered wireless camera that is configured to communicate images it captures to the image analysis system 302 in some embodiments. The snapshot camera 310 can communicate with the image analysis system 302 via the wireless module 520. The wireless module 520 can include a radio transmitter and/or receiver. The wireless module 520 is configured to communicate with the image analysis system 302 via a Wi-Fi network, a Zigbee network, adhoc wireless communication, and/or any other type of wireless communication in some embodiments.

The snapshot camera 310 is configured to stored images that the snapshot camera 310 captures in image buffer 518. The image buffer 518 can be a memory device, e.g., a non-volatile memory device a volatile memory device, etc. The image buffer can the same as and/or similar to the memory 504. The snapshot camera 310 can periodically capture images and maintain an image buffer of a predefined length, e.g., store the most recent predefined number of images. The image analysis system 302 is configured to send a request for a predefined length of time and/or a particular timestamp in some embodiments. The request can be a query for information and can be sent to the snapshot camera 310 by the image analysis system 302 via network 517. Based on the request, image buffer 518 is configured to retrieve the images for the predefined length of time and/or starting from the predefined time spot to a predefined length of time into the past in some embodiments. The image buffer 518 can cause the wireless module 520 to transmit the retrieved images, a query result, to the image analysis system 302. The snapshot camera 310 can communicate the query result to the image analysis system 302 via the network 517.

The battery power circuit 522 is configured to power the snapshot camera 310 and the various components of the snapshot camera 310 (e.g., the image buffer 518 and/or the wireless module 520) in some embodiments. The battery power circuit 522 can include various power circuits and/or a battery. The battery may be a lithium ion battery, a nickel cadmium battery, a nickel metal hydride battery, and/or any other type of battery that is configured to store energy and power the snapshot camera 310 based on the stored energy in some embodiments.

The image analysis system 302 is shown to include a processing circuit 500. The processing circuit 500 is shown to include a processor 502 and a memory 504. In some embodiments, the image analysis system 302 is made up of multiple processing circuits that are distributed across multiple computing systems, servers, controllers, etc. However, as an illustrative embodiment, the image analysis system 302 is described with a single processing circuit, the processing circuit 500 which can be one or multiple processing circuits.

The processing circuit 500 is shown to include a processor 502 and a memory 504. The processing circuit 500 can include any number of processing devices and/or memory devices. The processor 502 can be implemented as a general purpose processor, an application specific integrated circuit (ASIC), one or more field programmable gate arrays (FPGAs), a group of processing components, or other suitable electronic processing components. The memory 504 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 504 can be or include volatile memory and/or non-volatile memory.

The memory 504 can include object code components, script components, or any other type of information structure for supporting the various activities and information structures described in the present application. According to some embodiments, the memory 504 is communicably connected to the processor 502 via the processing circuit 500 and can include computer code for executing (e.g., by the processing circuit 500 and/or the processor 502) one or more processes of functionality described herein.

The memory 504 is shown to include a snapshot camera manager 510, a down facing image processor 512, a facial recognition manager 514, and an access controller 516. The access controller 516 is configured to operate the door control system 304 to lock and/or unlock a door in some embodiments. In this regard, the access controller 516 is configured to receive an indication from the facial recognition manager 14 with an indication to unlock a door (an authorized user has been identified by the facial recognition manager 514) in some embodiments. In some embodiments, the door and/or the front facing camera 308 includes a light indicating that the door has been unlocked. The access controller 516 can cause the light to illuminate and/or illuminate a particular color to indicate that the door is unlocked.

The facial recognition manager 514 is configured to identify whether a face detected in an image captured by the front facing camera 308 is the face of an authorized user in some embodiments. The facial recognition manager 514 is configured to implement deep learning and/or deep neural networks to perform facial recognition in some embodiments (e.g., license free facial recognition networks or licensed facial recognition networks). Since the front facing camera 308 is configured to capture 2D images and/or 3D images, the facial recognition manager 514 is configured to perform 2D facial recognition based on the 2D images in some embodiments. The facial recognition manager 514 can perform various forms of image processing or machine learning, e.g., support vector machines, artificial neural network model (ANN) (e.g., convolutional neural networks (CNNs), recurrent neural networks (RNN), etc.) decision trees, Bayesian models, deep learning algorithms, clustering algorithms, and/or any other type of supervised, unsupervised, and/or semi-supervised machine learning.

In some cases, an intruder might print an image of an authorized face on a piece of paper and show the authorized face on the piece of paper to the front facing camera 308 to trick the facial recognition manager 514. To overcome this type of issue, the facial recognition manager 514 is configured to perform liveliness detection in some embodiments. The facial recognition manager 514 is configured to analyze a 3D image captured by a 3D sensor of the front facing camera 308 enabling both 2D image (red green blue (RGB) image) facial recognition by the facial recognition manager 514 and/or depth based image processing by the facial recognition manager 514 in some embodiments. The depth image can contain the distance of each pixel from the front facing camera 308 thus enabling the facial recognition manager 514 to identify the topography of a face in front of the front facing camera 308. The facial recognition manager 514 is configured to verify liveliness of a face by comparing the topography of the pixels that are detected to a typical face topography. For example, the captured topography can be matched to a model indicating nominal facial topographies. If the match level is above a predefined level, the face can be verified as a real face. This means that the facial recognition manager 514 can detect a face printed on a paper (which has flat or cyclic topography) and reject the printed image, in some embodiments.

The down facing image processor 512 is configured to process an image received from down facing camera 306 to detect tailgating as a user enters through a door in some embodiments. Based on the images captured by the down facing camera 306, the down facing image processor 512 is configured to count the number of people entering the door per each "door open" event facilitated by the access controller 516 in some embodiments. The down facing camera 306 can include a 3D sensor enabling much higher reliability and ease of installation. By using a 3D image, the down facing image processor 512 may be agnostic to local features such as color of the floor, illumination levels, color of clothes, color of hair, etc. The down facing image processor 512 to count occupants with high accuracy based on the 3D images. In addition, all processing can be done in the sensor (for example, the down facing image processor 512 can be implemented on the down facing camera 306).

FIG. 5A includes a network 517 for the image analysis system 302, the snapshot camera 310, the door control system 304, the front facing camera 308, and/or the down facing camera 306 to communicate on. The network 517 may be a wired and/or wireless network such as at least one of and/or a combination of a Wi-Fi network, a wired Ethernet network, a Zigbee network, and a Bluetooth network. In some embodiments, the network 517 is an security network. In various embodiments, the network 517 operates with a proprietary communication protocol. The network 517 may be a local area network or a wide area network (e.g., the Internet, a building WAN, etc.) and may use a variety of communications protocols (e.g., N2, BACnet, BACnet MS/TP, IP, LON, etc.). In various embodiments, the communications protocols may be physically implemented over RS-485, RS-232, RS-422, PS/2, USB, fire wire, Ethernet, Zigbee, Wi-Fi, etc. In some embodiments, the network 517 is an ad hoc network (ad hoc Wi-Fi, ad hoc Zigbee, ad hoc Bluetooth, NFC, etc.). In some embodiments, the devices and/or systems of FIG. 5A form a MANET, a VANET, a SPAN, an IMANET, and/or any other ad hoc network. The network 517 may include routers, cables, network switches, connectors, wireless repeaters, radio modules, and/or any other component necessary for implementing wireless and/or wired communication.

The image analysis system 302, the snapshot camera 310, the door control system 304, the front facing camera 308, and/or the down facing camera 306 can include network interface circuits for communicating via the network 517. In some embodiments, the network interface circuits include various connectors, amplifiers, filters, controllers, transformers, radios, impedance matching circuits, and/or any other component necessary for communicating via the network 517 and/or with various systems, devices, and/or equipment. In some embodiments, the network interfaces include one or more wireless transceivers (e.g., a Wi-Fi transceiver, a Bluetooth transceiver, a NFC transceiver, a cellular transceiver, etc.) for communicating via the network 517.

The down facing camera 306 and the front facing camera 308 can be configured to communicate images captured by the cameras 306 and 308 respectively to the image analysis system 302. The images communicated to the image analysis system 302 can be the images that the image analysis system 302 performs analysis on. The images can be 2D images and/or 3D dimensional images. In this regard, the cameras 306 and 308 can each include both a 2D camera and a 3D camera.

The down facing camera 306 can include a two dimensional camera 524 while the front facing camera 308 can include a two dimensional camera 526. The two dimensional cameras 524-526 can be configured to capture two dimensional images including multiple pixels, each pixel indicating a value for red, green, and blue. The two dimensional cameras 524-526 can be or include a charge-couple device (CCD) and/or a complementary metal-oxide semiconductor (CMOS) sensor. The two dimensional cameras 524-526 can be, or can be a sensor of, a compact camera, an action camera, a bridge camera, a mirrorless interchangeable-lens camera, a modular camera, a digital single-lens reflect camera, a digital single lens translucent camera, a security camera, and/or any other type of camera or image generating device.

The down facing camera 306 includes a three dimensional camera 528 while the front facing camera 308 includes a three dimensional camera 530. The three dimensional cameras 528-530 can be configured to generate images representative of depth. For example, each pixel of the images generated by the three dimensional cameras 528-530 can indicate a distance from a subject to the camera. The three dimensional cameras 528-530 can be stereo vision cameras, structured light cameras, time of flight cameras, etc.

Figure 5B:
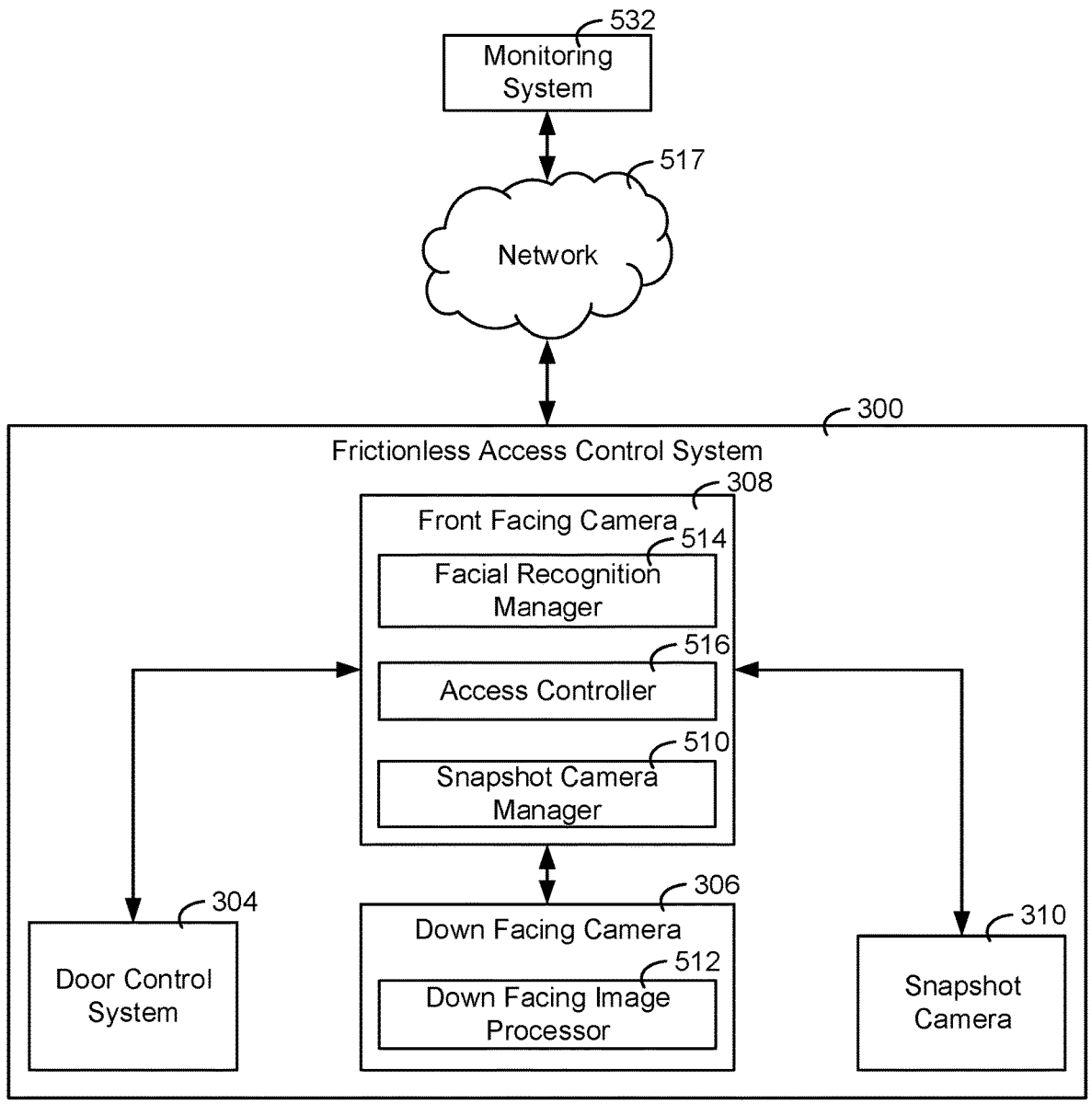
FIG. 5B is a block diagram of the access system of FIGS. 3-4 illustrating image processing and door control being performed locally on the cameras of FIG. 3, according to an exemplary embodiment.

Referring now to FIG. 5B, the cameras 306-310 are shown with local processing being performed by the front facing camera 308 and the down facing camera 306, according to an exemplary embodiment. Each of the front facing camera 308 and the down facing camera 306 can include a processing circuit similar to the processing circuit 500 so that the front facing camera 308 is configured to implement the facial recognition manager 514, the snapshot camera manager 510, and/or the access controller 516 locally and the down facing camera 306 is configured to implement the down facing image processor 512 locally in some embodiments. The images captured by the front facing camera 308, the down facing camera 306, and/or the snapshot camera 310 can be communicated to a monitoring system 532 for user review via the network 517. The monitoring system 532 can provide an interface to a user for reviewing images captured by the access control system 300 via a display (e.g., screen, touchscreen, monitor, etc.) of a user device (e.g., a cellphone, a laptop computer, a desktop computer, etc.). In some embodiments, the monitoring system 532 runs a deep neural network (DNN) (or any of the operations of the facial recognition manager 514) to perform user identification on images received from snapshot camera 310.

The cameras 306 and 308 can be, or can be based on, Inuitive Cameras. For example, cameras 306 and/or 308 is configured to implement image processors such as the NU4000 Inuitive processor that is configured to perform 3D imaging, deep learning, and/or various other image processing functions in some embodiments. Each of the cameras 306 and 306 can include two cameras (e.g., a 2D camera and a 3D camera) and an embedded GPU processor. Each of the cameras 306-308 may be approximately three inches, by one half inch, by one half inch. In some embodiments, each of the cameras 306 and/or 308 are wireless devices and can be connected to a permanent power (e.g., a permanent power source of the door control system 304). The cameras 306-308 can be programmable and configured to run the face recognition algorithms as well as a tailgating detection algorithm (e.g., implement the facial recognition manager 514 and/or the down facing image processor 512) in some embodiments.

Figure 5C:
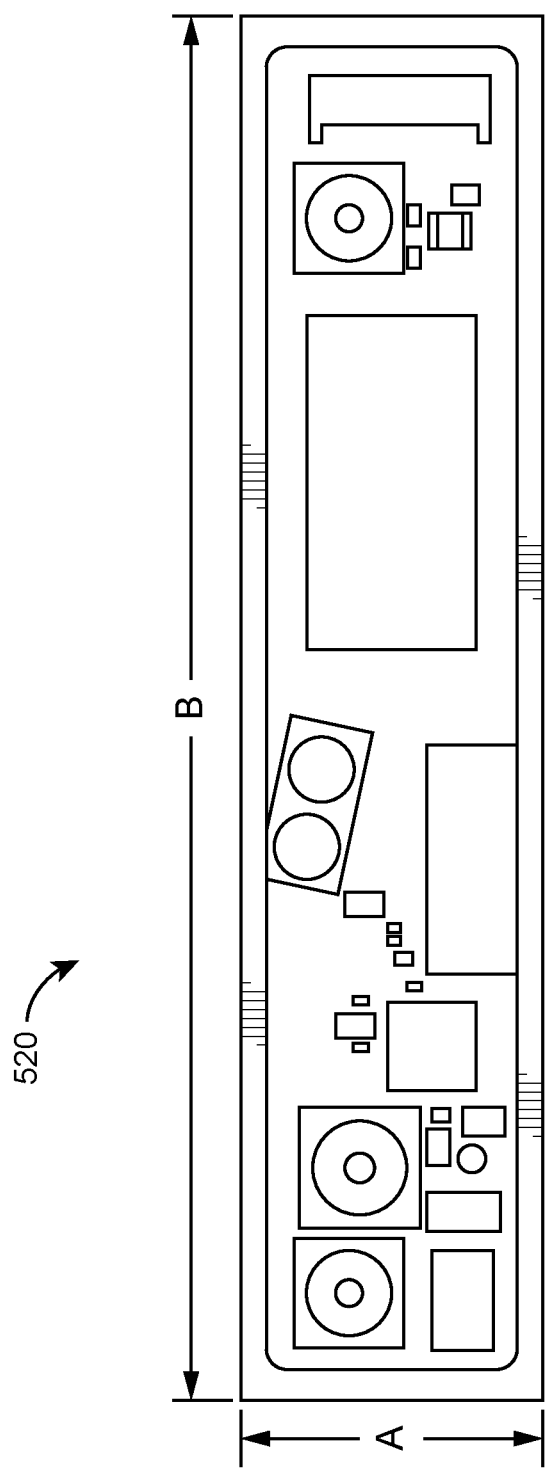
FIG. 5C is a drawing the front facing camera and the down facing camera of FIG. 3, according to an exemplary embodiment.

Referring now to FIG. 5C, a camera 534 is shown, according to an exemplary embodiment. The camera 306 and/or 308 may be the same as and/or similar to camera 534. Camera 534 can include both a 2D camera and a 3D camera. The 3D camera may be an active stereo imaging sensor. Furthermore, camera 534 can include a wireless communication module and an image processing system, e.g., a GPU, e.g., a Ceva based GPU that is configured to implement a deep neural network (DNN) and/or an advanced reduced instruction set computer (RISC) machine (ARM) controller in some embodiments. The camera 534 is shown to have dimensions A and B. The dimension A may be between a quarter inch and an inch. The dimension B may be between one inch and five inches.

Figure 6:
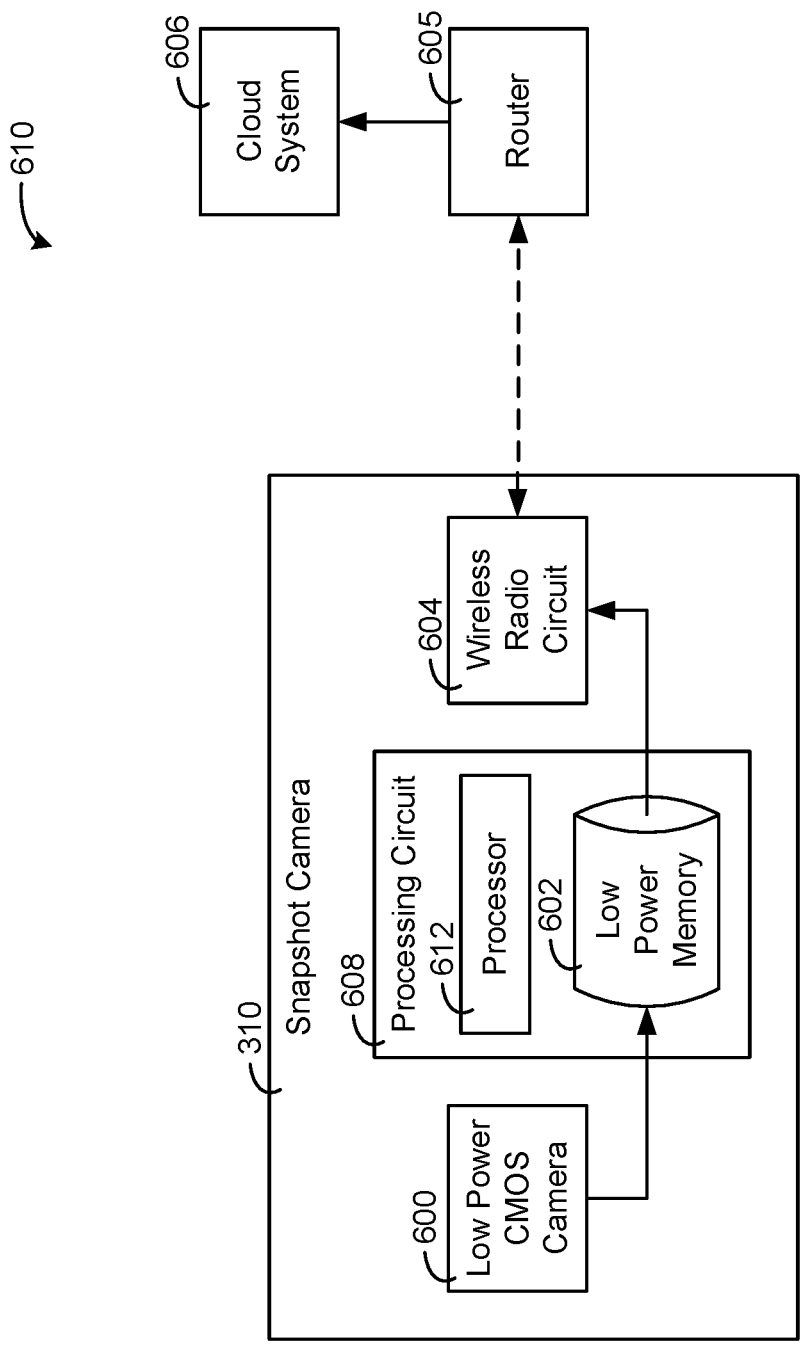
FIG. 6 is a block diagram of the battery driven wall camera of the access system of FIGS. 3-4, according to an exemplary embodiment.

Referring now to FIG. 6, a block diagram of a system 610 including the camera 310 is shown, according to an exemplary embodiment. The camera 310 is shown to include a low power CMOS camera 600 that is configured to capture 2D images and store the images in lower power memory 602, in some embodiments. The snapshot camera 310 can include a processing circuit 608 that includes a processor 612 and memory, the low power memory 602. The processing circuit 608, the processor 612, and/or the low power memory 602 can be the same as, or similar to, the processing circuit 500, the processor 502, and/or the memory 504 as described with reference to FIG. 5A. The low power memory 602 can be memory e.g., random access memory (RAM), dynamic RAM (DRAM), synchronous RAM (SRAM), synchronous dynamic RAM (SDRAM), etc. The camera 310 is further shown to include a wireless module 604 that is configured to communicate captured images stored in low power memory 602 to the Internet, e.g., communicate to cloud 606 via a router 605 in some embodiments.

The camera 310 can enable capturing of all people that entered the door per each "door open event." The images captured by camera 310 can be used for later investigation in case of a security breach, for indexing and tagging every door event or for smart analysis in real time of door events (e.g., a door forced open event) by deep learning algorithms (in a central cloud) that can understand how many people actually entered the door and have good frontal pictures of the people, including their faces.

Internet protocol (IP) cameras may require cabling due to their high-power requirements. Typical IP cameras may consume 5 W which is not feasible for a battery powered device. The main reason for this power consumption in IP cameras is CMOS (e.g., a CMOS camera and/or CMOS circuitry) and encoding on the internal processor, as well as Wi-Fi transmission of the video which are not designed for low power. The camera 310 is configured to utilize low power CMOS and a processor that can enable an "always on" video buffer for only 2 mW, in some embodiments. This video can be buffered in the camera and per "door open event," the camera can send required images wirelessly through a low power communication protocol such as the PowerG, low power Bluetooth low energy (BLE), ZigBee, Z-Wave, and/or digital enhanced cordless telecommunications (DECT) ultra-low energy (ULE), protocols designed for low power and bandwidth, which can support the transmission of snapshot images taken by the camera 310. In this regard, rather than streaming video like an IP camera might, the snapshot images communicated only when necessary can save power and/or network bandwidth.

Figure 7:
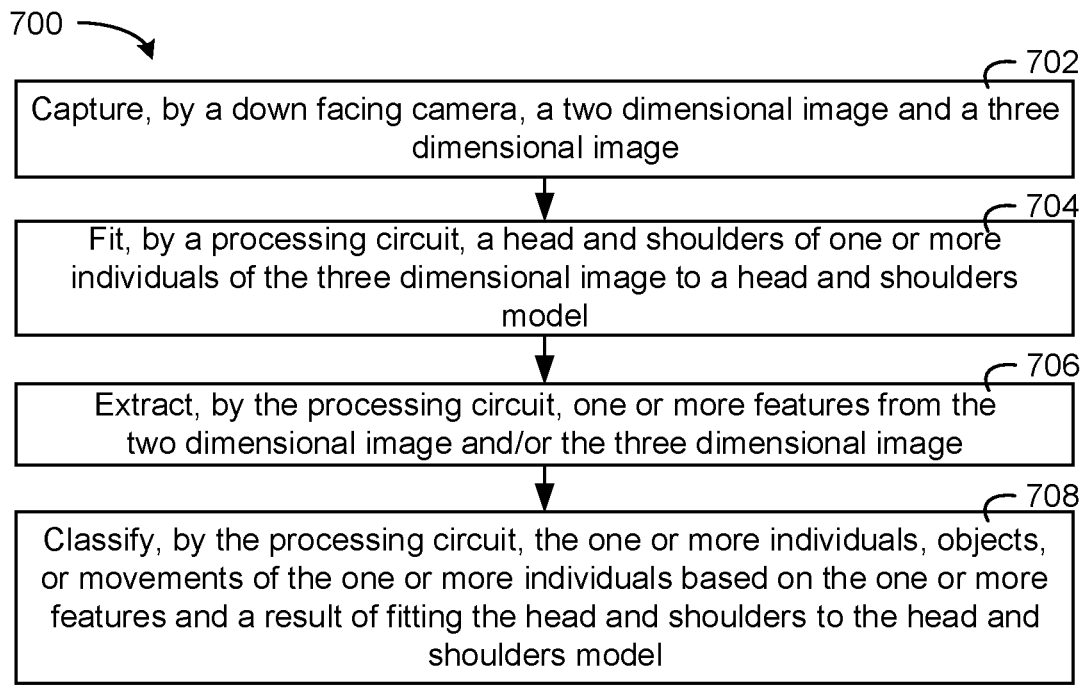
FIG. 7 is a flow chart of image analysis that can be performed by the image analysis system of FIG. 5A for images captured by the front facing camera, the down facing camera, and the battery driven wall camera, according to an exemplary embodiment.

Referring now to FIG. 7, a process 700 is shown for classifying an object detected in an image that can be performed by the image analysis system 302, according to an exemplary embodiment. Although the process 700 is described with reference to the image analysis system 302, each of cameras 306-310 can perform the process 700 locally. The process 700 is described with reference to the down facing image processor 512 specifically but can also be performed for facial image recognition via the facial recognition manager 514.

In step 702, images can be captured by the down facing camera 306. The captured images can include a 2D image and a 3D image. For example, the down facing camera 306 can include both a 2D camera module and a 3D camera module. The 2D camera module can capture one or more frames and/or video including pixels representing colors and objects within the image (e.g., an individual, an object, or a tailgating individual). The 3D camera module can capture images representative of depth, i.e., each "pixel" of the images and/or video captured by the 3D camera module may represent a distance from the camera such that the topography of a user or a face of a user can be captured.

Based on the captured images of step 702, the down facing image processor 512 is configured to detect users within the images in some embodiments. In step 704, the down facing image processor 512 is configured to fit a head and shoulders detected within the images to identify a person. For example, the down facing image processor 512 may store a head and shoulders model indicating a nominal head and shoulders of an individual from an overhead perspective. The head and shoulders of the individuals of the 3D images can be fit to the model. If the head and shoulders of an individual fit the model indicating a predefined matching level, the head and shoulders can be verified as an individual and not part of an object. In some embodiments, a classification model identifies, based on the 3D image, whether a head and shoulders are present in the 3D image.

In step 706, the down facing image processor 512 extracts various features from the 2D image. For example, features may be lines, shapes, classes (e.g., is the user holding out their arm, is the user located next to an object, etc.), etc. In some embodiments, the features can be hierarchical, i.e., lines may make up shapes, shapes may make up classes, etc. Based on the head and shoulders fit to the head and shoulders model and the extracted features, in step 708, the down facing image processor 512 can classify the identified candidate of step 704. For example, the classification may be that a single individual, or multiple individuals, are detected. For example, if in step 704 two sets of heads and shoulders are detected and fit to the head and shoulders model, the down facing image processor 512 can determine that two users are present. Furthermore, the classification can indicate actions of a user. For example, a user may be performing a gesture (e.g., a wave, raising a hand, etc.), the gesture requesting a door be unlocked or opened. Furthermore, the classification can indicate objects. For example, if a user is carrying an object, the down facing image processor 512 can generate a classification result indicating that the user is carrying an object.

Figure 8:
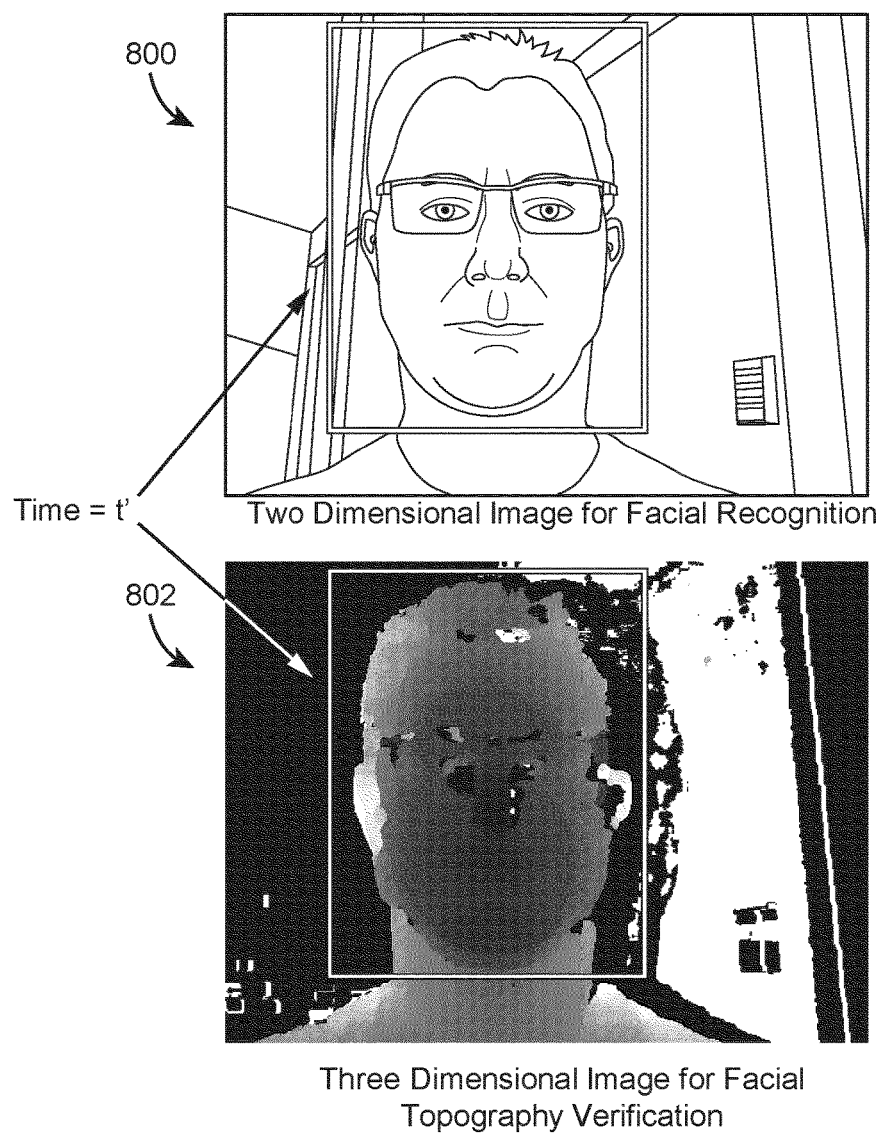
FIG. 8 is a drawing of exemplary images captured by the front facing camera of FIG. 3, the images indicating a two dimensional (2D) pixel image and a three dimensional (3D) depth image, according to an exemplary embodiment.

Referring now to FIG. 8, two images are shown captured by the front facing camera 308, according to an exemplary embodiment. Image 800 illustrates a 2D image of a face. The facial recognition manger 514 is configured to identify whether there is a face within the image 800 and identify whether the detected face is the face of a user that should be authenticated and allowed to walk through a door in some embodiments. Furthermore, the image 802 illustrates a 3D image captured by the front facing camera 308 illustrating the typology of the face. The facial recognition manger 514 is configured to determine, based on the topology of the 3D image, whether the face is a real face as opposed to an image of a face, in some embodiments. In this regard, if, based on the 2D image, the facial recognition manager 514 identifies a user that is authenticated to walk through a door but based on the image 802 detects that the face is not a real face (e.g., it is a picture of a face printed out and shown to the front facing camera 308), the facial recognition manager 514 can determine that the door should not be unlocked.

The facial recognition manager 514 is configured to perform face detection on the images 800 and 802 with an efficient neural network in some embodiments. In some embodiments, the facial recognition manager 514 is configured to implement FaceNet architecture, Anyvision architecture, and/or any other facial recognition system in some embodiments. In some embodiments, the facial recognition manager 514 is configured to implement facial recognition at high frame rates (e.g., 5-10 frames per second (FPS)). The face recognition performed by the facial recognition manager 514 can be performed on a user one meter to two meters away and/or can be performed on a moving object moving at approximately one meter per second. In some embodiments, if the facial recognition manager 514 detects at least three valid recognized images of a sequence of images captured by the front facing camera 308, the facial recognition manager 514 identifies that the detection is valid. The facial recognition manager 514 is configured to support various angles of a face of a user, can form a correspondence between a 2D RGB image and a 3D depth image, and/or can perform fusion of a few images in some embodiments.

Figure 9:
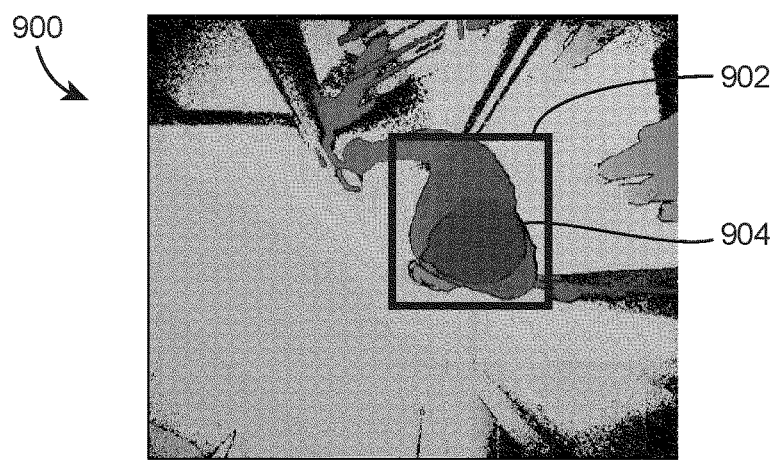
FIG. 9 is a drawing of an exemplary image captured by the down facing camera of FIG. 3, the image being a three dimensional depth image, according to an exemplary embodiment.

Referring now to FIG. 9, an image 900 is shown where a user 904 is identified within the image 900, according to an exemplary embodiment. The image 900 can be captured by the down facing camera 306. The user 904 is shown in a box 902 in the image 900. The box 902 may represent the identified pixels that the down facing image processor 512 is configured to determine contain a user, in some embodiments. The image 900 illustrates a 3D image. The down facing image processor 512 is configured to detect the user 904 based on the topography of the 3D image 900 in some embodiments.

The down facing image processor 512 is configured to extract a pointcloud from a depth image, find local minima in the point cloud, fit the pointcloud to a model using random sample consensus (RANSAC), extract simple statistical features around the local minima, and/or perform classification with a decision tree in some embodiments. In some embodiments, the down facing image processor 512 is configured to perform a heuristic for tracking a user between consecutive images. To find the local minima, the down facing image processor 512 is configured to run a histogram of oriented gradients (HOG) filter on small cells (e.g., multiple scales) and/or run a dlib classifier (a support vector machine (SVM) like classifier) in some embodiments. Finding the local minima may identify the user within the image.

Figure 10:
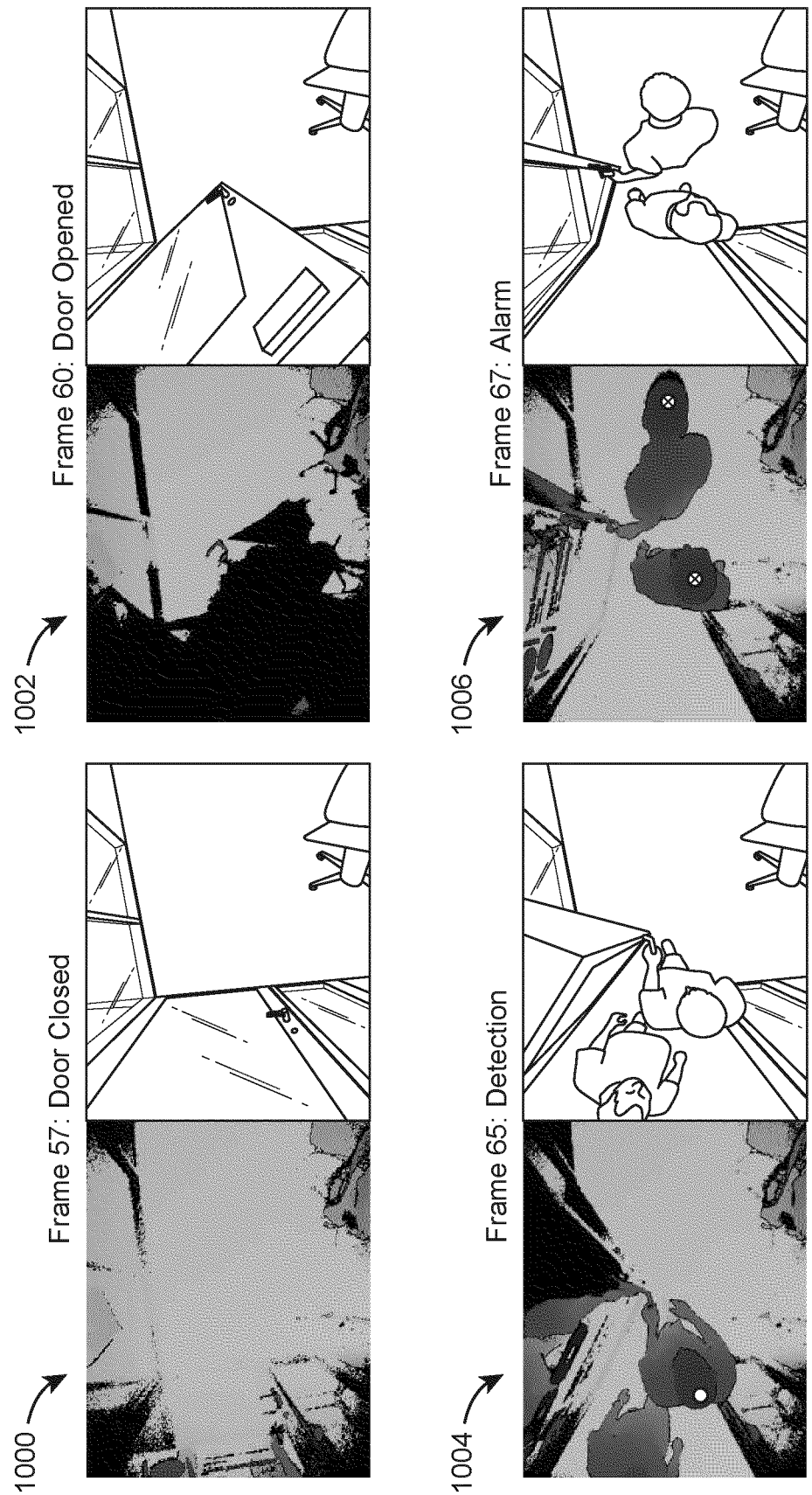
FIG. 10 is a drawing of exemplary images captured by the down facing camera of FIG. 3 indicating the detection by the image analysis system of FIG. 4 of two individuals entering through a doorway, according to an exemplary embodiment.

Referring now to FIG. 10, images 1000-1006 are shown illustrating 2D and 3D images that can be captured by the down facing camera 306 and processed by the down facing image processor 512 to detect multiple users, according to an exemplary embodiment. The images 1000-1006 can be displayed and viewed via an interface of the monitoring system 532. As can be seen in the images 1000-1006, multiple users are present. The down facing image processor 512 configured to identify that two users have entered and can raise an alarm if only one user was supposed to enter, e.g., only one user was authenticated via the facial recognition manager 514 in some embodiments.

Figure 11:
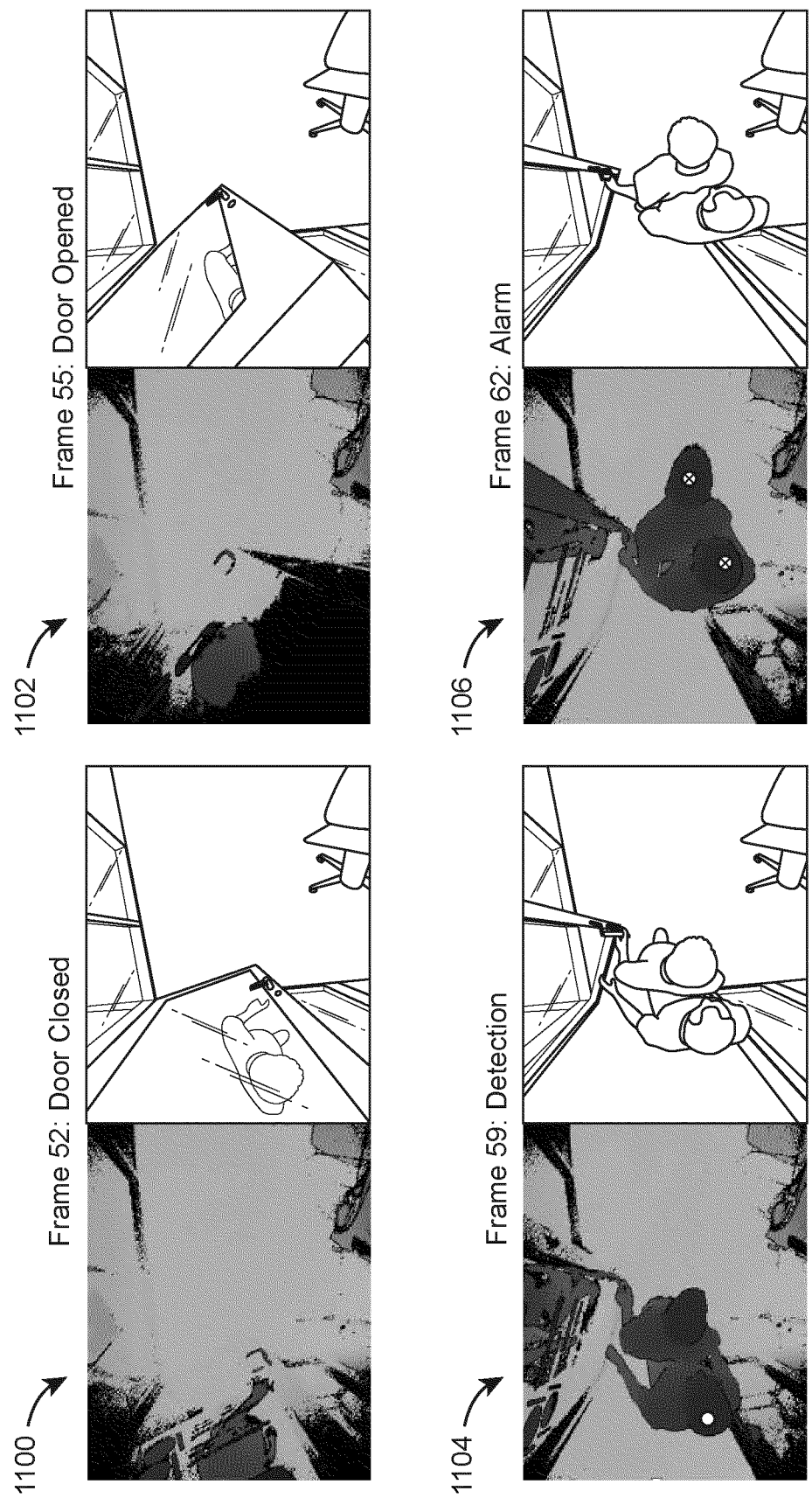
FIG. 11 is a drawing of exemplary images captured by the down facing camera of FIG. 3 indicating the detection by the image analysis system of FIG. 4 of one individual tailgating another individual through a doorway, according to an exemplary embodiment.

Referring now to FIG. 11, images 1100-1106 are shown illustrating 2D and 3D images that can be captured by the down facing camera 306 and processed by the down facing image processor 512 to detect one user tailgating another user, according to an exemplary embodiment. The images 1100-1106 can be displayed and viewed via an interface of the monitoring system 532. As can be seen in the images 1100-1106, one user is tailgating another user to avoid the detection by the front facing camera 308. The down facing image processor 512 is configured to identify that one user is tailgating another user can raise an alarm in response to this detection in some embodiments.

In some embodiments, the down facing image processor 512 can raise a tailgating alarm of various priority levels. For example, the front facing camera 308 may identify two separate users. Rather than waiting to be authenticated by the front facing camera 308, the second user may tailgate the first user. The down facing image processor 512 can receive the indication that two users were authenticated and can detect that the second user tailgates the first user. The down facing image processor 512, rather than generating a tailgating event of a high priority, can generate a low priority tailgating event, e.g., an indication that the door was not used properly but that no danger is present since both users are authenticated.

Other priority levels can be generated if the second user is classified as a user who is dangerous. For example, the front facing camera 308 may store a list of users who are dangerous, e.g., are wanted by the police, are banned from a building, etc. If the front facing camera 308 detects the dangerous user and the down facing camera 306 subsequently detects that a tailgating event occurred, the down facing image processor 512 can generate a high priority alarm and/or provide the alarm to security personal. A medium level alarm can be generated by the down facing camera processor 512 if an unknown user is classified by the front facing camera 308 and the down facing image processor 512 subsequently identifies a tailgating event.

Figure 12:
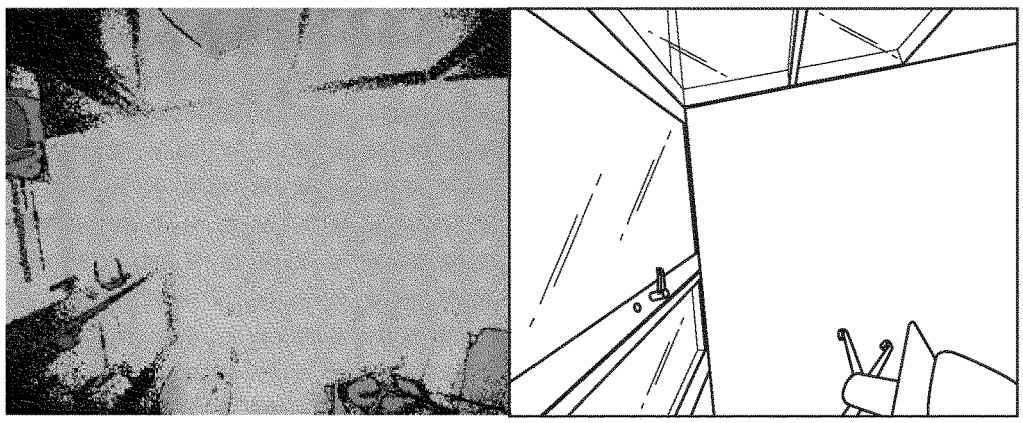
FIG. 12 is a drawing of exemplary images captured by the down facing camera of FIG. 3 indicating the detection by the image analysis system of FIG. 4 of one individual and an object moving through a doorway, according to an exemplary embodiment.
Figure 12:
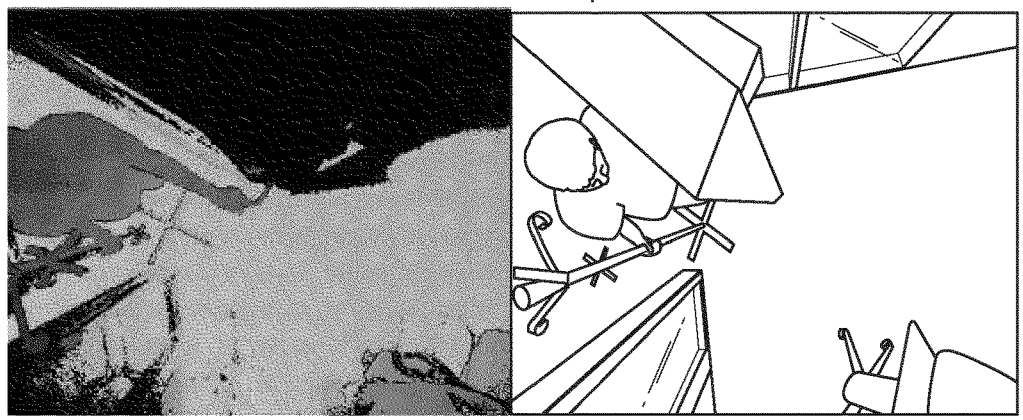
Figure 12:
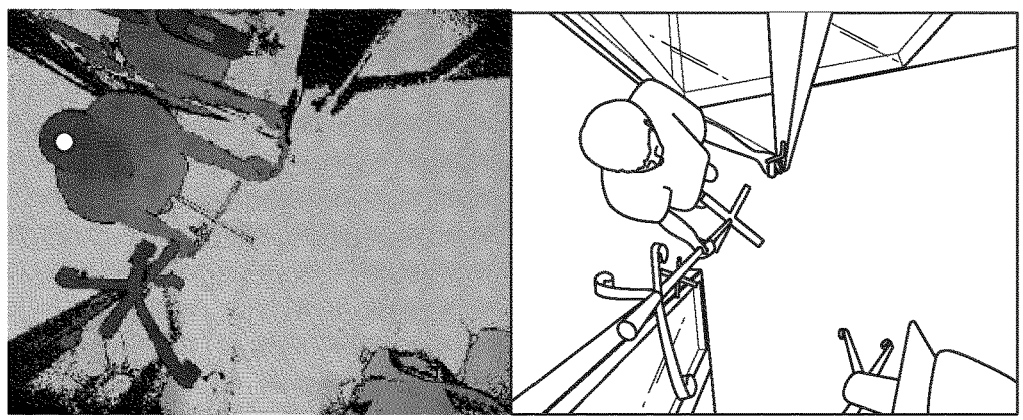

Referring now to FIG. 12, images 1200-1204 are shown illustrating 2D and 3D images that can be captured by the down facing camera 306 and processed by the down facing image processor 512 to detect one user carrying an object, according to an exemplary embodiment. The images 1200-1204 can be displayed and viewed via an interface of the monitoring system 532. As can be seen in the images 1200-1204, one user is present carrying an object. The down facing image processor 512 is configured to identify the user and is not confused by the object carried by the user in some embodiments. The down facing image processor 512 does not raise any alarm since the down facing image processor 512 only counts the user as entering the door and does not mistakenly think the object carried by the user is another user.

Figure 13:
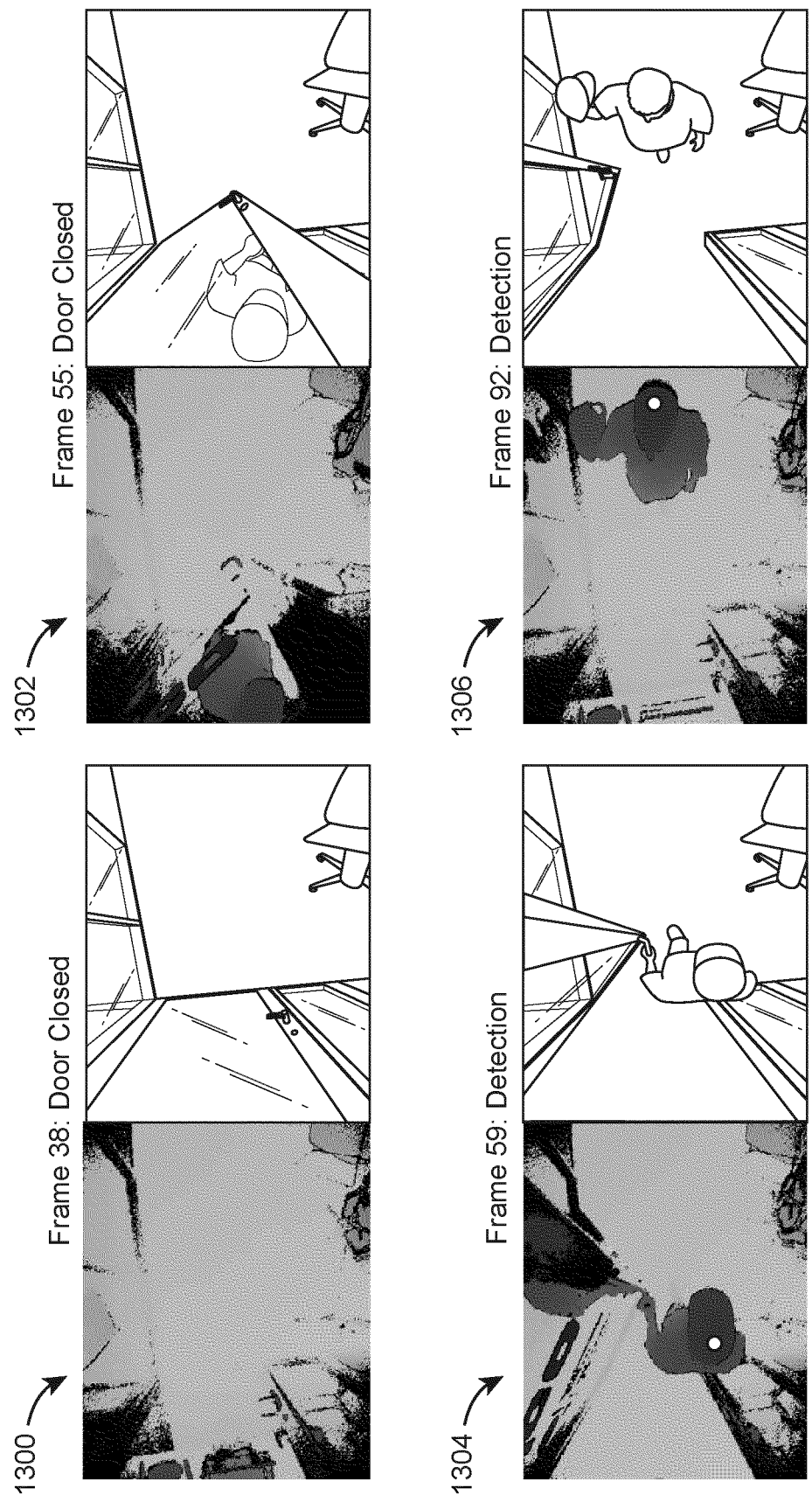
FIG. 13 is a drawing of exemplary images captured by the down facing camera of FIG. 3 indicating the detection by the image analysis system of FIG. 4 of one individual and a hat moving through a doorway, according to an exemplary embodiment.

Referring now to FIG. 13, images 1300-1306 are shown illustrating 2D and 3D images that can be captured by the down facing camera 306 and processed by the down facing image processor 512 to detect one user wearing and/or carrying a hat, according to an exemplary embodiment. The images 1300-1306 can be displayed and viewed via an interface of the monitoring system 532. As can be seen in the images 1300-1306, one user is present carrying wearing and carrying a hat. The down facing image processor 512 is configured to identify the user and is not confused by the hat worn or carried by the user in some embodiments. The down facing image processor 512 does not raise an alarm since the down facing image processor 512 only counts the user as entering the door and does not mistakenly think the hat carried by the user is another user.

Figure 14:
FIG. 14 is a drawing of exemplary images captured by the down facing camera of FIG. 3 indicating the detection by the image analysis system of FIG. 4 of one individual performing a gesture to open a door, according to an exemplary embodiment.

Referring now to FIG. 14, an image 1400 is shown illustrating a 2D and 3D image that can be captured by the down facing camera 306, according to an exemplary embodiment. The 1400 illustrates a user making a motion holding their arm up in the air. This motion may correspond to a command to unlock the door. The down facing image processor 512 is configured to detect this gesture, in some embodiments. In some embodiments, the down facing image processor 512 processes the topography of the 3D image to detect that the user is making the motion to unlock the door. In response to detecting the motion and/or in response to an image processed by facial recognition manager 514 identified an authenticated face, access controller 516 is configured to unlock the door in some embodiments.

Figure 15:
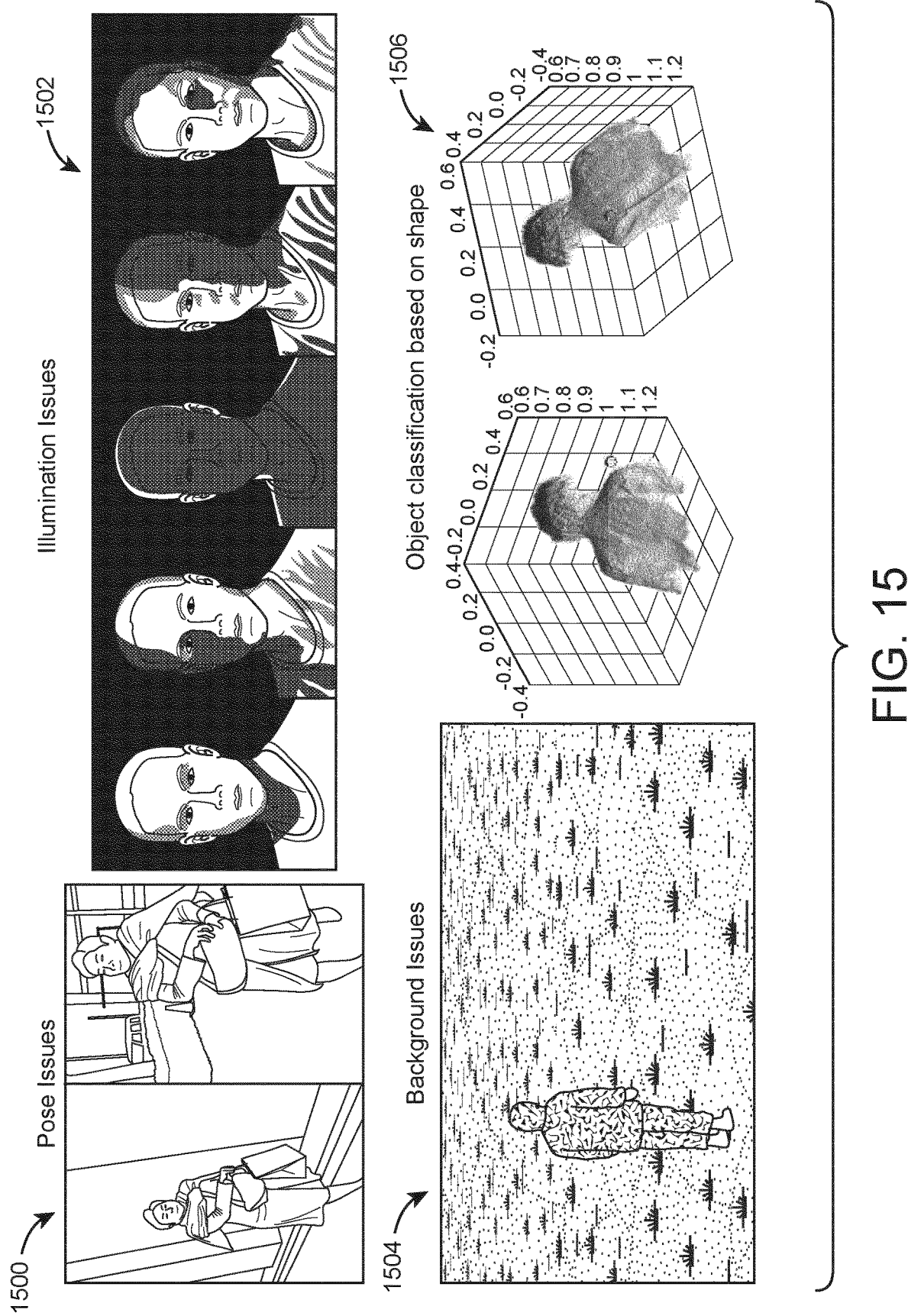
FIG. 15 is a drawing of images which pose difficulty for color pixel classification and a 3D model, according to an exemplary embodiment.

Referring now to FIG. 15, images are shown illustrating the benefits of performing image processing on 3D images instead of 2D images, according to an exemplary embodiment. Image 1500 illustrates a woman taken from two different angles, two different poses. The results of image processing of a 2D image may change based on the pose of the target subject. However, object classification based on shape, e.g., as shown in image 1506, may identify the same object even if taken from different poses. Furthermore, illumination differences as shown in image 1502 may not have any effect on the 3D image since the 3D image may not be light based. Finally, background issues, such as a user blending in with their environment as shown in image 1504 may not be an issue since the 3D image may not depend on color. Furthermore, using 3D images can help identify separation between objects, for example, image processing to detect tailgating of a 3D image may be better than image processing of a 2D image.

Figure 16:
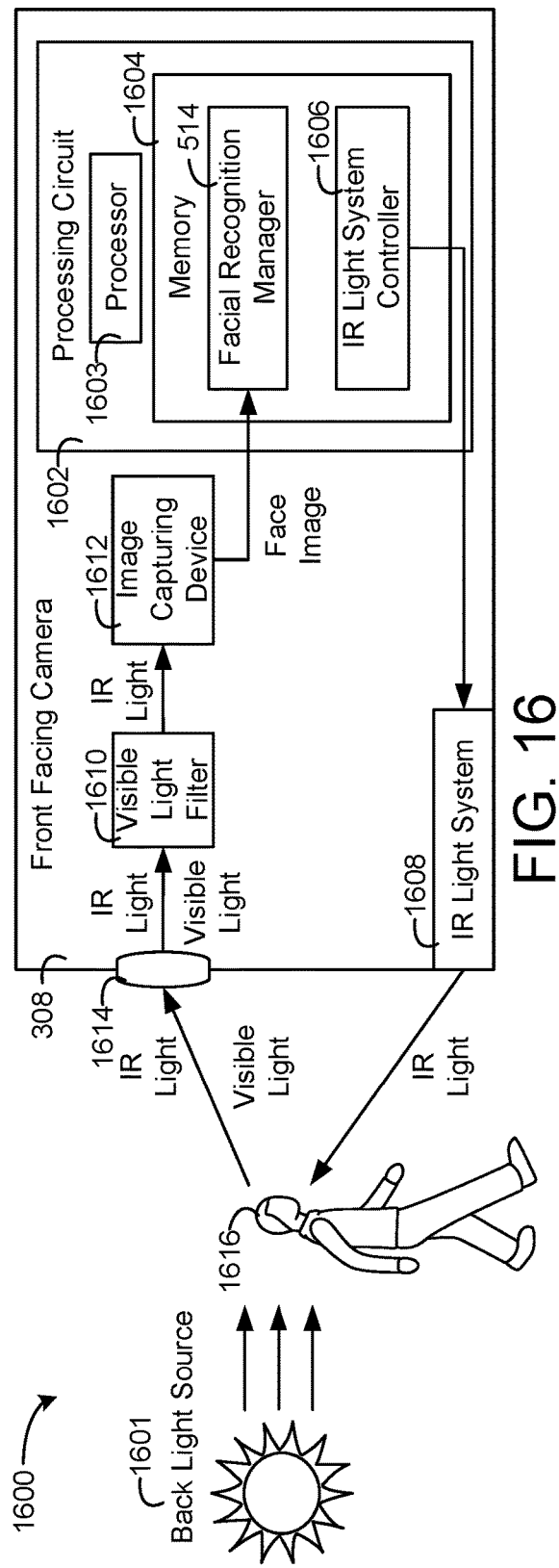
FIG. 16 is a block diagram of the front facing camera of FIG. 3 including a visible light filter that generates images based on infrared (IR) light for facial recognition to correct overexposure from backlighting, according to an exemplary embodiment.

Referring now to FIG. 16, a system 1600 including the front facing camera 308 is shown with a visible light filter for preventing visible light overexposure, according to an exemplary embodiment. FIG. 16 is shown to include a back light source 1601 and a user 1616. The back light source 1601 may generate light in a visible spectrum (and in various other spectrums in some cases). The back light source 1601 may be a natural light source, e.g., sunlight coming through a glass window, a glass door, an open window, an open door, a skylight, etc. Furthermore, the back light source 1601 may be an artificial light source, e.g., an ambient lighting system of a building, a lamp, a light bulb, an LED, etc.

The user 1616 can be a user that the front facing camera 308 captures an image of and performs image processing based recognition on. For example, the front facing camera 308 may capture an image of a face of the user 1616 can perform facial recognition on the face. However, based on the presence of the back light source 1601, the front facing camera 308 may be overexposed with visible light, making it difficult for the front facing camera 308 to perform facial recognition since the face of the user 1616 may not be properly distinguishable in the captured image. In this regard, the front facing camera 308 generates the image of the user 1616 based on IR light instead of visible light to prevent overexposure of visible light and improve the facial recognition performed by the front facing camera 308.

The front facing camera 308 includes an aperture 1614, a visible light filter 1610, an image capturing device 1612, and an IR light system 1608. Furthermore, the front facing camera 308 includes a processing circuit 1602 including a processor 1603 and a memory 1604. The processing circuit 1602, the processor 1603, and/or the memory 1604 can be the same as or similar to the processing circuit 500, the processor 502, and/or the memory 504 as described with reference to FIG. 5A. In some embodiments, the processing circuit 1602 is a GPU. In some embodiments, the processing circuit 1602 is an embedded general purpose processing system and not necessarily a GPU.

The memory 1604 includes the facial recognition manager 514 and an IR light system controller 1606. The facial recognition manager 514 is described in greater detail with reference to FIS. 5A-5B and elsewhere herein. The IR light system controller 1606 is configured to operate the IR light system 1608 causing the IR light system 1608 to activate and illuminate the user 1616 with IR light. The IR light system 1608 can be configured to cause the IR light system 1608 to activate and/or deactivate, i.e., turn on and/or turn off. The IR light system controller 1606 can cause the IR light system 1608 to turn on constantly. In some embodiments, the IR light system controller 1606 generates control signals (e.g., pulse modulation waves of varying duty cycles) to operate the IR light system 1608.

The IR light system 1608 can include one or more circuits and one or more IR LEDs. The one or more circuits can be power circuits and/or any other driving circuit for operating the IR LEDs. The IR light system 1608 can include a single IR LED and/or multiple IR LEDs. The IR LEDs can be configured to generate light in an IR spectrum. For example, the IR light may have a wavelength between 700 nanometers (nm) and 1 millimeter (mm). The IR light may be within a corresponding frequency spectrum of 430 Terahertz (THz) and 300 Gigahertz (GHz) and a corresponding photon energy spectrum of 1.7 electron volts (eV) and 1.24 mille eV (meV). While the IR light system 1608 is shown to be a component of the front facing camera 308, in some embodiments, the IR light system 1608 can be located external to the front facing camera 308 and may be a separate component.

The IR light generated by the IR light system 1608 and other visible light can enter the front facing camera 308 through the aperture 1614. The visible light can be generated from any light source, including the back light source 1601. The visible light may have a wavelength between 400 nm and 700 nm. The visible may be within a corresponding frequency spectrum of 790 THz and 430 THz and a corresponding photon energy spectrum of 3.3 eV and 1.7 eV.

The aperture 1614 can be any opening allowing light reflecting off of the user 1616 to enter the camera. The aperture 1614 can be a hole in the front facing camera 308 allowing the light to pass into the camera 308 into the visible light filter 1610. The aperture 1614 can be part of a lens of the front facing camera 308 in some embodiments. In some embodiments, the size of the aperture 1614 is static. In some embodiments, the size of the aperture 1614 can be controlled by the processing circuit 1602.

The IR light and the visible light passed by the aperture 1614 can enter the visible light filter 1610. The visible light filter 1610 can be configured to filter out the visible light but pass the IR light. The visible light filter 1610 can be a bandpass filter or a cutoff filter. For example, the bandpass filter can include a passband of IR light (e.g., the passband including frequencies between any range of 430 THz and 300 GHz) while all other frequencies can be filtered out (the stop band). The visible light filter 1610 may also be a cutoff filter (e.g., a lowpass filter) passing all frequencies up to the cutoff frequency of the IR spectrum (e.g., any frequency between 430 THz and 300 GHz) and stopping all frequencies past the cutoff frequency.

The image capturing device 1612 can be a camera device configured to generate an image. The image capturing device 1612 can be sensitive to IR light (e.g., 430 THz and 300 GHz), visible light (e.g., 790 THz and 430 THz), and/or any other light. The image capturing device 1612 can be a CCD and/or a CMOS sensor. The image capturing device 1612 can be, or be a light sensor of, a thermographic camera. The image capturing device 1612 can be, or can be a light sensor of, a compact camera, an action camera, a bridge camera, a mirrorless interchangeable-lens camera, a modular camera, a digital single-lens reflect camera, a digital single lens translucent camera, and/or any other type of camera or image generating device.

The image capturing device 1612 can receive the light passed by the visible light filter 1610 (the IR light) and not receive any light filtered out by the visible light filter 1610 (the visible light). Based on the IR light, the image capturing device 1612 can generate an image or multiple images (e.g., a video) which can be provided to the facial recognition manager 514. The image capturing device 1612 can be configured to generate a 2D image with multiple pixels of varying resolutions, each pixel representing various levels of IR light intensity and/or various colors (e.g., values for red, green, and/or blue).

The image that the image capturing device 1612 can be a face of the user 1616. In some embodiments, the image is one frame of a series of frames of a video of the user 1616. Since the image is generated based on IR light, the image may not be in color. For example, the image may be a black and white image where light areas of the image represent high IR light intensity while dark areas represent low IR light intensity. However, the deep learning, or other facial recognition performed by the facial recognition manager 514 may operate properly based on the black and white, i.e., color may not be required by the facial recognition manager 514 to perform facial recognition. The image of the face of the user 1616 can be used by the facial recognition manger 514 to identify the face of the user 1616, compare the face to authorized faces, and determine whether the user 1616 should be given access to an area of the building.

Figure 17:
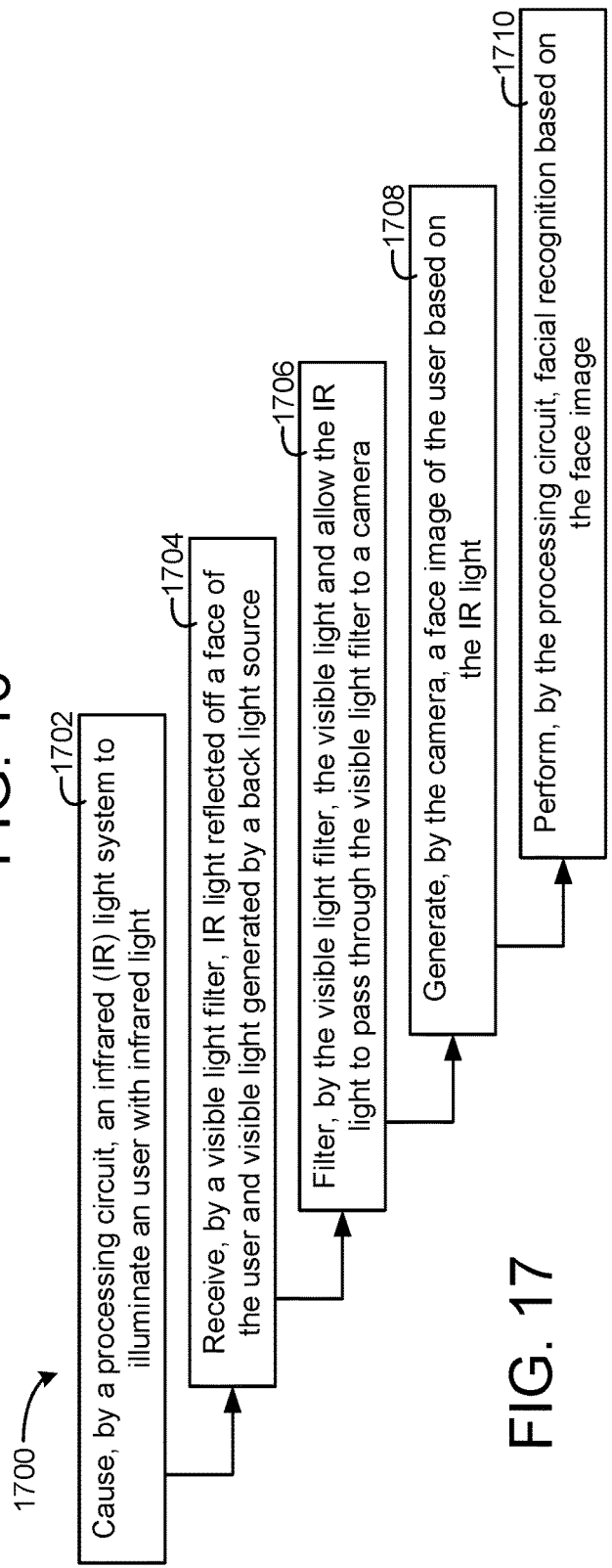
FIG. 17 if a flow diagram of a process of generating an image with only IR light by filtering out visible light and performing facial recognition on the image to avoid overexposure from backlight that can be performed by the front facing camera of FIG. 16, according to an exemplary embodiment.

Referring now to FIG. 17, a process 1700 of performing facial image recognition based on an IR light generated image of a face, according to an exemplary embodiment. The front facing camera 308 can be configured to perform the process 1700. Furthermore, any of the snapshot camera 310 or the down facing camera 306 can be configured (e.g., include the necessary components) to perform the process 1700. While the process 1700 describes performing facial recognition within the front facing camera 308, in some embodiments, the facial recognition is performed remotely, e.g., by the image analysis system 302.

In step 1702, the IR light system controller 1606 of the processing circuit 1602 causes the IR light system 1608 to be activated to generate IR light to illuminate the user 1616. In some embodiments, the IR light system controller 1606 causes the IR light system 1608 to be activated and generating IR light. The IR light system controller 1606 can generate various signals for driving the IR light system 1608, e.g., a binary signal, a sinusoidal wave, a square wave, a triangle wave, etc. In some embodiments, the IR light system controller 1606 generates a PWM wave and varies or holds constant a duty cycle of the PWM wave.

In step 1704, the visible light filter 1610 receives the IR light which is reflected off a face of the user 1616. Furthermore, the visible light filter 1610 receives visible light generated by other sources, e.g., the back light source 1601. In some embodiments, the visible light filter 1610 receives the light through the aperture 1614. Furthermore, the visible light filter 1610 can receive light of any other wavelength, in some embodiments.

In step 1706, the visible light filter 1610 can filter out the visible light but pass the IR light. In some embodiments, the visible light filter 1610 passes all light except visible light. In some embodiments, the visible light filter 1610 passes only IR light and filters out all other light. In step 1708, the image capturing device 1612 generates an image based on the IR light. The pixels of the image may represent the intensity of the IR light reflected off of the face of the user 1616. Although the image may not represent color, the image may be appropriate for the facial recognition manager 514, in step 1710, to perform facial recognition and/or authentication of the user 1616. For example, the facial recognition manager 514 can, based on the IR based face image, identify the user 1616 (e.g., by comparing the face to a stored database of faces, by passing the face through a neural network, etc.) and determine whether the user 1616 is authorized to access an area of the building.

Figure 18:
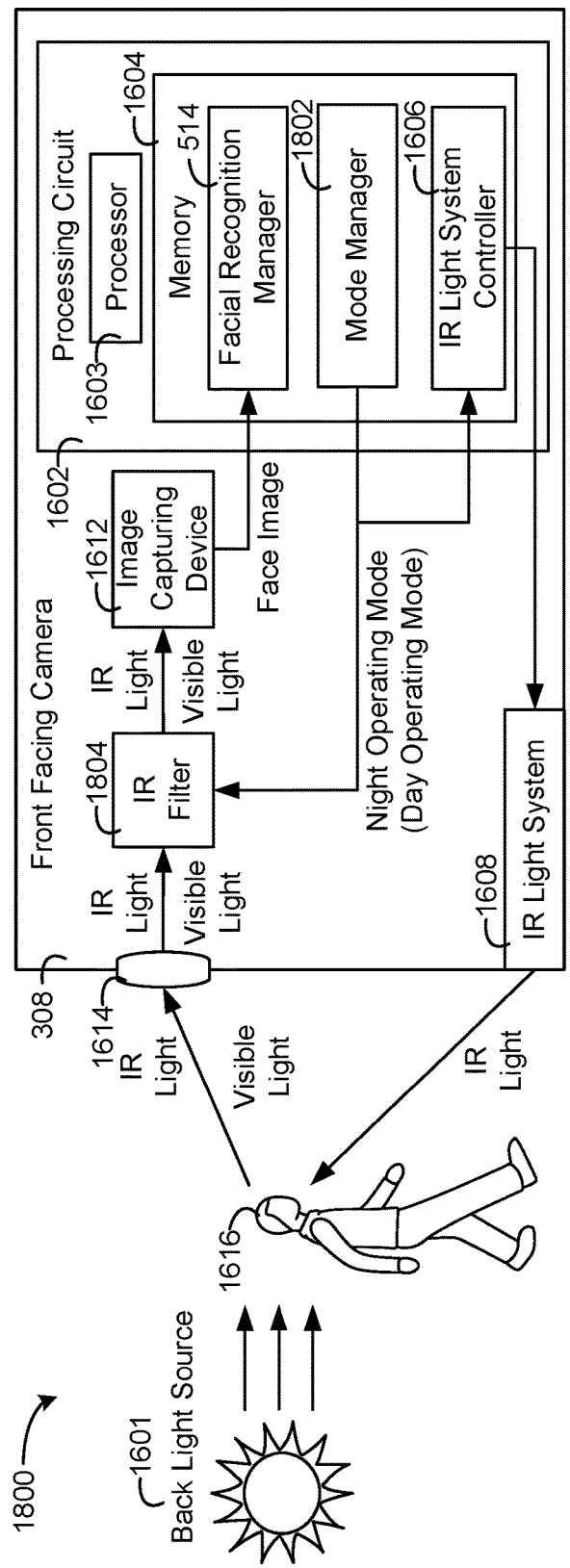
FIG. 18 is a block diagram of the front facing camera of FIG. 3 including an IR light filter that can be operated in a night mode to generate images based on IR light and visible light for facial recognition to avoid overexposure from backlight, according to an exemplary embodiment.

Referring now to FIG. 18, a system 1800 including the front facing camera 308 is shown with an IR filter that can be deactivated in a night operating mode to allow an image to be generated based on IR light for correcting visible light overexposure, according to an exemplary embodiment. The front facing camera 308 described in FIG. 18 may be similar to the front facing camera 308 described in FIG. 16 but may include an IR filter 1804 instead of the visible light filter 1610. Furthermore, the front facing camera 308 of FIG. 18 can include a mode manager 1802.

The IR filter 1804 can be configured to filter out IR light. The IR filter 1804 can further be configured to pass visible light and/or other non-IR light. It may be desired to generate the face image that the facial recognition manager 514 operates on with IR light. However, the IR filter 1804, when active, may prevent the face image from being generated on IR light. In this regard, the IR filter 1804 can be configured to operate in an activated and a deactivated mode. In the activated mode, the IR filter 1804 can filter out IR light and pass visible light. In the deactivated mode, the IR filter 1804 can pass both IR light and visible light.

The IR filter 1804 can be mechanically operated such that the IR filter 1804 moves a filtering component (e.g., a filtering lens) from a light path between the aperture 1614 and the image capturing device 1612 (in the day operating mode) to outside the light path (in the night operating mode). In this regard, the IR filter 1804 may include one or more electromechanical devices (e.g., motors) that move the filtering component between a position to filter out IR light and a position to allow the IR light to pass.

The IR filter 1804 can be a cutoff filter (e.g., a highpass filter) configured to pass light above a particular cutoff frequency, e.g., a frequency above the IR spectrum. For example, the cutoff frequency can be between 430 THZ and 790 THz. In some embodiments, the IR filter 1804 is a bandpass filter configured to pass light of the visible spectrum, i.e., the pass band of the IR filter 1804 may be a spectrum of frequencies between 430 THZ and 790 THZ.

The front facing camera 308 can be configured to operate in both a day operating mode and a night operating mode. The day operating mode activates the IR filter 1804 to filter out IR light, a mode suitable to generate images during the day when an artificial or natural light source illuminates the user 1616. Operating the in night mode deactivates the IR filter 1804 allowing the face image to be generated based on both IR light and visible light, a mode suitable for generating images during the night or any other situation where visible light is low.

The mode manager 1802 can be configured to cause the IR filter 1804 to operate in the night operating mode or the day operating mode. The mode manager 1802 can, in some embodiments, be configured to cause the IR filter 1804 to operate constantly in the night operating mode to correct overexposure of visible light of the back light source 1601. In some embodiments, the IR light system controller 1606 can be configured to activate the IR light system 1608 whenever the mode manager 1802 operates the front facing camera 308 in the night operating mode.

The IR light (generated by the IR light system 1608) and the visible light reflected off the user 1616 or generated as backlight can be passed by the aperture 1614 to the IR filter 1804. Based on the operating mode of the mode manager 1802, the IR filter 1804 can pass both IR light and visible light (night operating mode) or filter out the IR light and pass only the visible light (day operating mode). In the night operating mode, the IR filter 1804 can pass both the IR light and the visible light to the image capturing device 1612.

The image capturing device 1612 can generate the face image of the face of the user 1616 based on both the IR light and the visible light when the IR filter 1804 is operated in the night operating mode by the IR filter 1804. The image can be provided to the facial recognition manager 514 which is configured to perform facial recognition and user authentication, in some embodiments.

Figure 19:
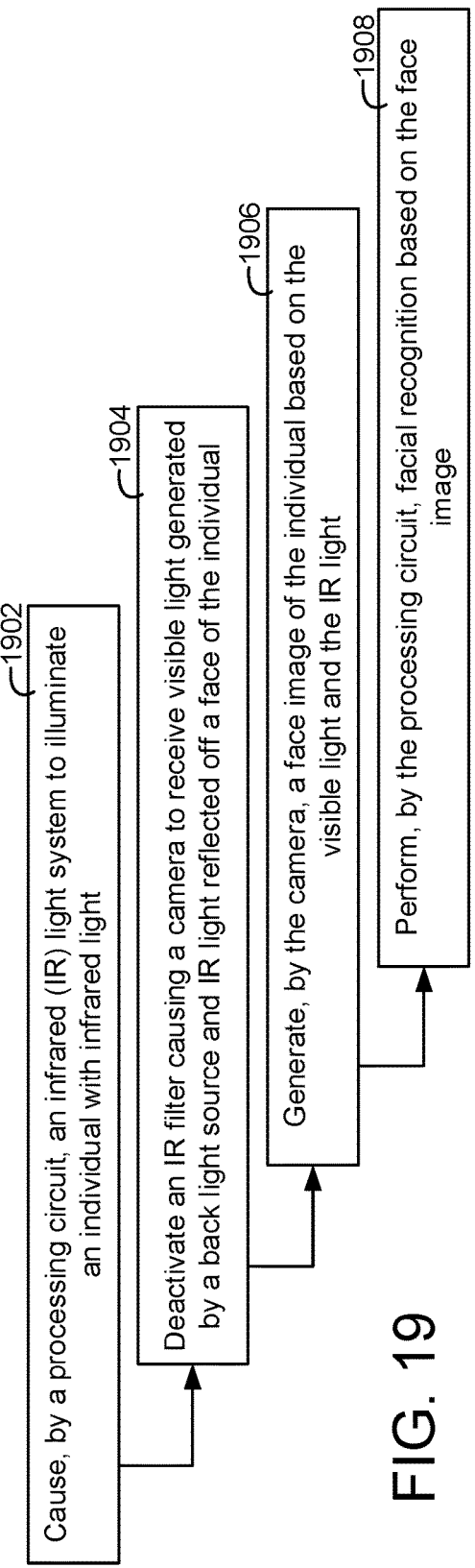
FIG. 19 is a flow diagram of a process of operating an IR light filter in a night mode to generate images based on IR light and visible light and performing facial recognition on the image to avoid overexposure from backlighting, according to an exemplary embodiment.

Referring now to FIG. 19, a process 1900 of performing facial image recognition based on an IR and visible light generated image of a face, according to an exemplary embodiment. The front facing camera 308 can be configured to perform the process 1900. Furthermore, any of the snapshot camera 310 or the down facing camera 306 can be configured (e.g., include the necessary components) to perform the process 1900. While the process 1900 describes performing facial recognition within the front facing camera 308, in some embodiments, the facial recognition is performed remotely, e.g., by the image analysis system 302.

In step 1902, the IR light system controller 1606 of the processing circuit 1602 causes the IR light system 1608 to be activated to generate IR light to illuminate the user 1616. In some embodiments, the IR light system controller 1606 causes the IR light system 1608 to be activated and generating IR light. The IR light system controller 1606 can generate various signals for driving the IR light system 1608, e.g., a binary signal, a sinusoidal wave, a square wave, a triangle wave, etc. In some embodiments, the IR light system controller 1606 generates a PWM wave and varies or holds constant a duty cycle of the PWM wave.

In step 1904, the mode manager 1802 deactivates the IR filter 1804 causing the image capturing device 1612 to receive visible light generated by the back light source 1601 and also IR light reflected off of the face of the user 1616, the IR light generated by the IR light system 1608. The mode manager 1802 can deactivate the IR filter 1804 by operating in a night mode. In some embodiments, the night mode is a user selected operating mode. When the night mode is selected, the mode manager 1802 can cause the IR filter 1804 to pass both IR light and visible light to the image capturing device 1612.

In step 1906, the image capturing device 1612 generates an image based on the IR light and the visible light passed by the IR filter 1804. The pixels of the image may represent the intensity of the IR light and/or the various wavelengths of visible light reflected off of the face of the user 1616 and/or generated by the back light source 1601. In step 1908, the facial recognition manager 514 performs facial recognition and/or authentication of the user 1616 based on the image generated in the step 1906. For example, the facial recognition manager 514 can, based on the IR and visible light based face image, identify the user 1616 (e.g., by comparing the face to a stored database of faces, by passing the face through a neural network, etc.) and determine whether the user 1616 is authorized to access an area of the building.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building access system for a building, the building access system comprising:
    a front facing camera system configured to receive infrared light of an infrared spectrum, deactivate an infrared light filter of the front facing camera configured to filter out the infrared light, and generate one or more images of a face of a user with the infrared light, wherein the front facing camera system comprises one or more front facing camera processing circuits configured to:
        detect and authenticate the user based on the one or more images generated by the front facing camera system with the infrared light; and
        operate building equipment to unlock a door of the building in response to an authentication of the user based on the one or more images of the front facing camera system; and
    a down facing camera system configured to capture one or more overhead images of the user from an overhead perspective, wherein the down facing camera system comprises one or more down facing camera processing circuits configured to:
        detect whether a second user is tailgating the user based on the one or more overhead images captured by the down facing camera system; and
        generate an alarm in response to a detection that the second user is tailgating the user.

2. The system of claim 1, wherein the one or more down facing camera processing circuits are configured to:
    detect, based on the one or more overhead images captured by the down facing camera system, a gesture by the user, wherein the gesture is associated with a command to unlock the door; and
    operate the building equipment to unlock the door of the building in response to a gesture detection indicating that the gesture has been performed.

3. The system of claim 1, wherein the one or more overhead images captured by the down facing camera system comprise one or more three dimensional images, wherein values of pixels of the one or more three dimensional images indicate a distance from the down facing camera system;

wherein the one or more down facing camera processing circuits are configured to detect whether the second user is tailgating the user by:

determining, based on the one or more three dimensional images, a number of users that are walking through the door; and determining that the second user is tailgating the user in response to a determination that the number of users that are walking through the door is greater than one.

4. The system of claim 1, wherein the one or more images captured by the front facing camera system comprise one or more three dimensional images and one or more two dimensional images, wherein first values of pixels of the one or more three dimensional images indicate a distance from the front facing camera system and second values of pixels of the one or more two dimensional images indicate color;

wherein the front facing camera system comprises a three dimensional camera configured to capture the one or more three dimensional images and a two dimensional camera configured to captured the one or more two dimensional images.

5. The system of claim 4, wherein the one or more front facing camera processing circuits are configured to detect and authenticate the user based on the one or more images by:

detecting an identity of the user based on the one or more two dimensional images;

determining whether the identity of the user is an authorized identity;

detecting a facial topography of the user based on the one or more three dimensional images;

determining whether the facial topography matches an authentic facial topography; and determining that the user is authenticated in response to a determination that the identity of the user is the authorized identity and a second detection that the facial topography matches the authentic facial topography.

6. The system of claim 1, wherein the front facing camera system further comprises:

an infrared light system configured to generate the infrared light, wherein the infrared light reflects off the face of the user;

an aperture device configured to receive the infrared light and visible light and pass the infrared light and the visible light to a visible light filter;

the visible light filter configured to filter out the visible light and pass the infrared light to an image capturing device; and the image capturing device configured to generate an image of the face of the user based on the infrared light passed by the visible light filter;

wherein the one or more front facing camera processing circuits are configured to perform facial recognition based on the image.

7. The system of claim 6, wherein the visible light filter is a bandpass filter, wherein a pass band of the bandpass filter comprises a spectrum of infrared light wavelengths.

8. The system of claim 1, wherein the front facing camera system further comprises:

an infrared light system configured to generate infrared light that reflects off the face of the user;

an aperture device configured to receive the infrared light and visible light and pass the infrared light and the visible light to the infrared light filter;

the infrared light filter configured to:

filter out the infrared light and pass the visible light to an image capturing device in a day operating mode; and pass the infrared light and pass the visible light to the image capturing device in a night operating mode; and the image capturing device configured to:

generate an image of the face of the user based on the visible light in the day operating mode; and generate the image of the face of the user based on the visible light and the infrared light in the night operating mode;

the one or more front facing camera processing circuits configured to:

cause the image capturing device to generate the face of the image based on the visible light and the infrared light by causing the infrared light filter to operate in the night operating mode; and perform facial recognition based on the image generated based on the visible light and the infrared light.

9. The system of claim 8, wherein the infrared light filter is a cutoff filter, wherein a pass band of the cutoff filter comprises a spectrum of visible light wavelengths and a stop band of the cutoff filter comprises a spectrum of infrared light wavelengths.

10. The system of claim 1, further comprising a snapshot camera, wherein the snapshot camera is configured to capture one or more snapshot images of the user or the second user after the user or the second user has walked through the door, wherein the snapshot camera comprises one or more processing circuits configured to:

store an image buffer in a memory device, the image buffer comprising a predefined number of most recent images captured by the snapshot camera;

receive an indication of a time associated with the door opening;

retrieve a set of images of the image buffer stored by the memory device based on the time associated with the door opening in response to receiving the indication; and communicate the set of images to a server via a network.

11. The system of claim 10, wherein the front facing camera system is powered via a permanent power source and the down facing camera system is powered via the permanent power source;

wherein the snapshot camera comprises a mobile power circuit, wherein the mobile power circuit is configured to store energy and power the snapshot camera based on the energy.

12. The system of claim 10, wherein the one or more images captured by the front facing camera system comprise first pixels indicating the face of the user as the user approaches the door, wherein the one or more overhead images captured by the down facing camera system comprise second pixels indicating the top of a head and shoulders of the user as the user walks through the door, and the one or more snapshot images captured by the snapshot camera comprise third pixels indicating a front side of the user as the user walks through the door.

13. The system of claim 10, wherein the front facing camera system is located on a first side of the door, the down facing camera system is located on a second side of the door, and the snapshot camera is located on the second side of the door.

14. An access control system for a building, system comprising:

a front facing camera system configured to receive infrared light of an infrared spectrum, deactivate an infrared light filter of the front facing camera configured to filter out the infrared light, and generate one or more images of a face of a user with the infrared light;

a down facing camera system configured to capture one or more overhead images of the user from an overhead perspective; and one or more processing circuits configured to:
  detect and authenticate the user based on the one or more images generated by the front facing camera system with the infrared light;
  operate building equipment to unlock a door of the building in response to an authentication of the user based on the one or more images of the front facing camera system;
  detect whether a second user is tailgating the user based on the one or more overhead images captured by the down facing camera system; and
  generate an alarm in response to a detection that the second user is tailgating the user.

15. The system of claim 14, wherein the one or more overhead images captured by the down facing camera system comprise one or more three dimensional images, wherein values of pixels of the one or more three dimensional images indicate a distance from the down facing camera system;
  wherein the one or more processing circuits are configured to detect whether the second user is tailgating the user by:
    determining, based on the one or more three dimensional images, a number of users that are walking through the door; and
    determining that the second user is tailgating the user in response to a determination that the number of users that are walking through the door is greater than one.

16. The system of claim 14, wherein the one or more images captured by the front facing camera system comprise one or more three dimensional images and one or more two dimensional images, wherein first values of pixels of the one or more three dimensional images indicate a distance from the front facing camera system and second values of pixels of the one or more two dimensional images indicate color;
  wherein the front facing camera system comprises a three dimensional camera configured to capture the one or more three dimensional images and a two dimensional camera configured to captured the one or more two dimensional images;
  wherein the one or more processing circuits are configured to detect and authenticate the user based on the one or more images by:
    detecting an identity of the user based on the one or more two dimensional images;
    determining whether the identity of the user is an authorized identity;
    detecting a facial topography of the user based on the one or more three dimensional images;
    determining whether the facial topography matches an authentic facial topography; and
    determining that the user is authenticated in response to a determination that the identity of the user is the authorized identity and a second detection that the facial topography matches the authentic facial topography.

17. The system of claim 14, wherein the front facing camera system further comprises:
  an infrared light system configured to generate infrared light that reflects off the face of the user;
  an aperture device configured to receive the infrared light and visible light and pass the infrared light and the visible light to a visible light filter;
  the visible light filter configured to filter out the visible light and pass the infrared light to an image capturing device; and
  the image capturing device configured to generate an image of the face of the user based on the infrared light passed by the visible light filter;
  wherein the one or more processing circuits are configured to perform facial recognition based on the image.

18. The system of claim 14, wherein the front facing camera system further comprises:
  an infrared light system configured to generate the infrared light, wherein the infrared light reflects off the face of the user;
  an aperture device configured to receive the infrared light and visible light and pass the infrared light and the visible light to the infrared light filter;
  the infrared light filter configured to:
    filter out the infrared light and pass the visible light to an image capturing device in a day operating mode; and
    pass the infrared light and pass the visible light to the image capturing device in a night operating mode; and
  the image capturing device configured to:
    generate an image of the face of the user based on the visible light in the day operating mode; and
    generate the image of the face of the user based on the visible light and the infrared light in the night operating mode;
  the one or more processing circuits configured to:
    cause the image capturing device to generate the face of the image based on the visible light and the infrared light by causing the infrared light filter to operate in the night operating mode; and
    perform facial recognition based on the image generated based on the visible light and the infrared light.

19. The system of claim 14, further comprising a snapshot camera, wherein the snapshot camera is configured to capture one or more snapshot images of the user or the second user after the user or the second user has walked through the door, wherein the snapshot camera comprises one or more snapshot camera processing circuits configured to:
  store an image buffer in a memory device, the image buffer comprising a predefined number of most recent images captured by the snapshot camera;
  receive an indication of a time associated with the door opening;
  retrieve a set of images of the image buffer stored by the memory device based on the time associated with the door opening in response to receiving the indication; and
  communicate the set of images to a server via a network.

20. A method of access control for a building, method comprising:
  generating, by a front facing camera, one or more images of a face of a user by receiving infrared light of an infrared spectrum, deactivating an infrared light filter of the front facing camera configured to filter out the infrared light, and generating the one or more images with the infrared light;
  capturing, by a down facing camera, one or more overhead images of the user from an overhead perspective;

detecting and authenticating, by a processing circuit, the user based on the one or more overhead images captured by the front facing camera;

operating, by the processing circuit, building equipment to unlock a door of the building in response to an authentication of the user based on the one or more images of the front facing camera;

detecting, by the processing circuit, whether a second user is tailgating the user based on the one or more overhead images captured by the down facing camera; and generating, by the processing circuit, an alarm in response to a detection that the second user is tailgating the user.

* * * * *